US010239443B2

(12) United States Patent  
Kanayama et al.

(10) Patent No.: US 10,239,443 B2  
(45) Date of Patent: Mar. 26, 2019

(54) HEADLAMP AND MOBILE OBJECT

(71) Applicant: Panasonic Intellectual Property Management Co., Ltd., Osaka (JP)

(72) Inventors: Yoshihiko Kanayama, Hyogo (JP); Naoki Tomoda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 15/364,494

(22) Filed: Nov. 30, 2016

(65) Prior Publication Data

US 2017/0158113 A1 Jun. 8, 2017

(30) Foreign Application Priority Data

Dec. 4, 2015 (JP) ................................ 2015-238021

(51) Int. Cl.
| | |
|---|---|
| *B60Q 1/08* | (2006.01) |
| *B60Q 1/00* | (2006.01) |
| *G06K 9/00* | (2006.01) |
| *H04N 5/225* | (2006.01) |
| *F21S 41/143* | (2018.01) |

(Continued)

(52) U.S. Cl.  
CPC .......... *B60Q 1/085* (2013.01); *B60Q 1/0023* (2013.01); *F21S 41/143* (2018.01); *F21S 41/147* (2018.01); *F21S 41/255* (2018.01); *F21S 41/265* (2018.01); *F21S 41/336* (2018.01); *F21S 45/47* (2018.01); *G06K 9/00791* (2013.01); *H04N 5/2253* (2013.01); *B60Q 2300/056* (2013.01); *G06T 2207/30252* (2013.01)

(58) Field of Classification Search  
CPC ..... B60Q 1/085; B60Q 1/0023; F21S 41/265; F21S 41/147; F21S 41/336; F21S 41/143; F21S 41/255; F21S 45/47; G06K 9/00791; H04N 5/2253  
USPC ........................................................ 362/509  
See application file for complete search history.

(56) References Cited

U.S. PATENT DOCUMENTS 9,212,799 B2 * 12/2015 Todaka .................. F21S 41/19  
9,574,732 B2 * 2/2017 Nakada ............... F21S 48/1275  
(Continued)

FOREIGN PATENT DOCUMENTS

| JP | 2006-164735 | 6/2006 |
| JP | 2007-227228 | 9/2007 |

(Continued)

*Primary Examiner* — Bryon T Gyllstrom  
(74) *Attorney, Agent, or Firm* — Renner Otto Boisselle & Sklar, LLP

(57) ABSTRACT

A headlamp that projects light forward includes: a low beam light source module; a reflector disposed in a path of light from the low beam light source module; and a first lens body and second lens body disposed farther forward than the low beam light source module and the reflector. The reflector reflects first light and second light, which are portions of the light from the low beam light source module, toward the first lens body and the second lens body, respectively. The first lens body transmits and projects, to a first region, the first light reflected by the reflector. The second lens body transmits and projects, to a second region larger than the first region and including a region closer to the headlamp than the first region, the second light reflected by the reflector. The first light is higher in luminous intensity than the second light.

18 Claims, 13 Drawing Sheets

(51) Int. Cl.
 *F21S 41/147* (2018.01)
 *F21S 41/255* (2018.01)
 *F21S 41/265* (2018.01)
 *F21S 41/33* (2018.01)
 *F21S 45/47* (2018.01)

(56) References Cited

U.S. PATENT DOCUMENTS

| | | | |
|---|---|---|---|
| 2006/0120094 A1 | 6/2006 | Tsukamoto et al. | |
| 2007/0201241 A1* | 8/2007 | Komatsu | F21S 41/143 362/545 |
| 2010/0118559 A1* | 5/2010 | Nakada | F21S 48/1159 362/539 |
| 2012/0134167 A1* | 5/2012 | Huang | B60Q 1/0041 362/519 |
| 2013/0010488 A1* | 1/2013 | Koizumi | F21S 41/147 362/517 |
| 2013/0083553 A1* | 4/2013 | Sekiguchi | B60Q 1/0041 362/517 |
| 2016/0097505 A1* | 4/2016 | Kinouchi | F21S 48/1376 362/509 |

FOREIGN PATENT DOCUMENTS

| | | |
|---|---|---|
| JP | 2010-118203 | 5/2010 |
| JP | 2011-243474 | 12/2011 |

* cited by examiner

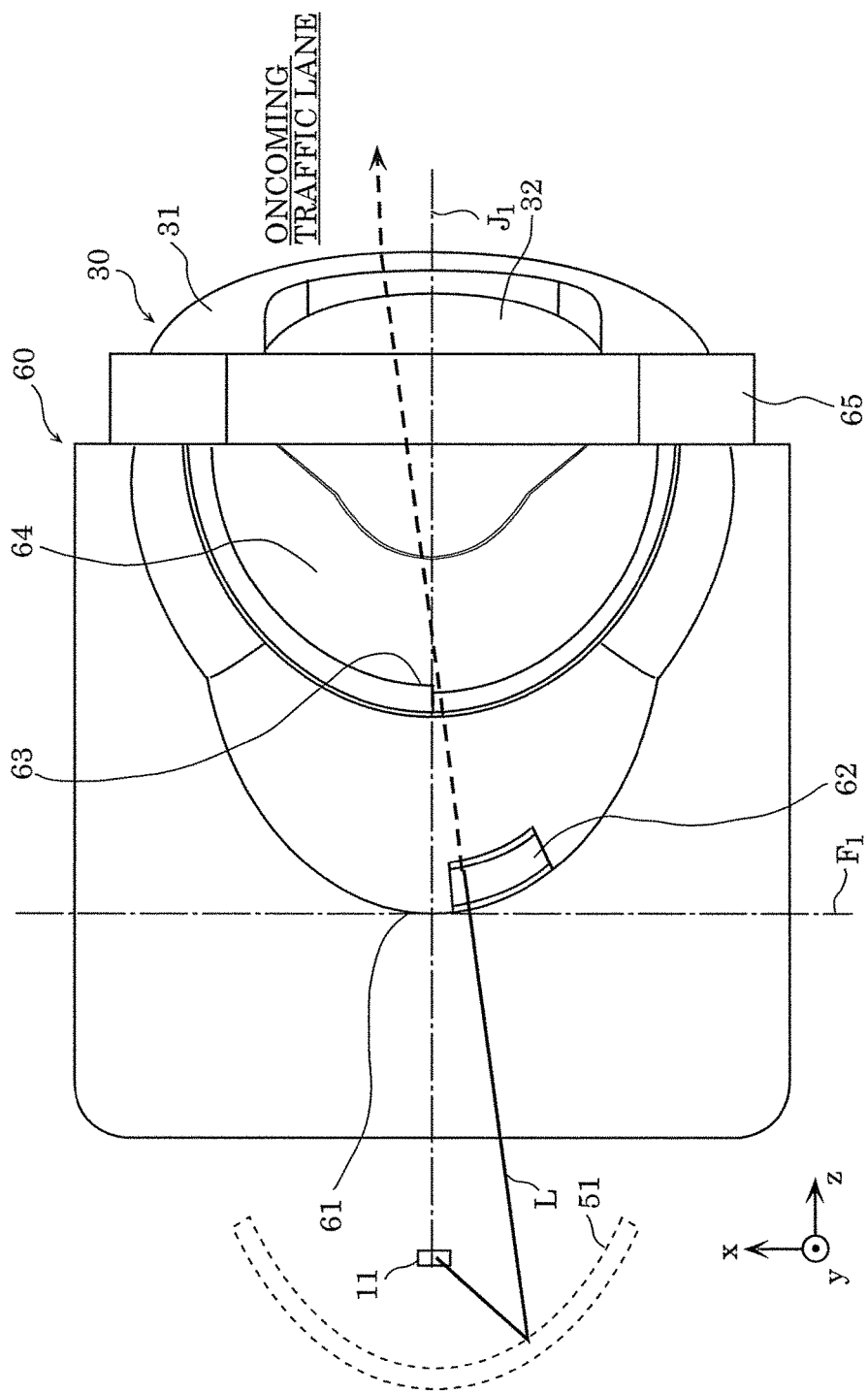

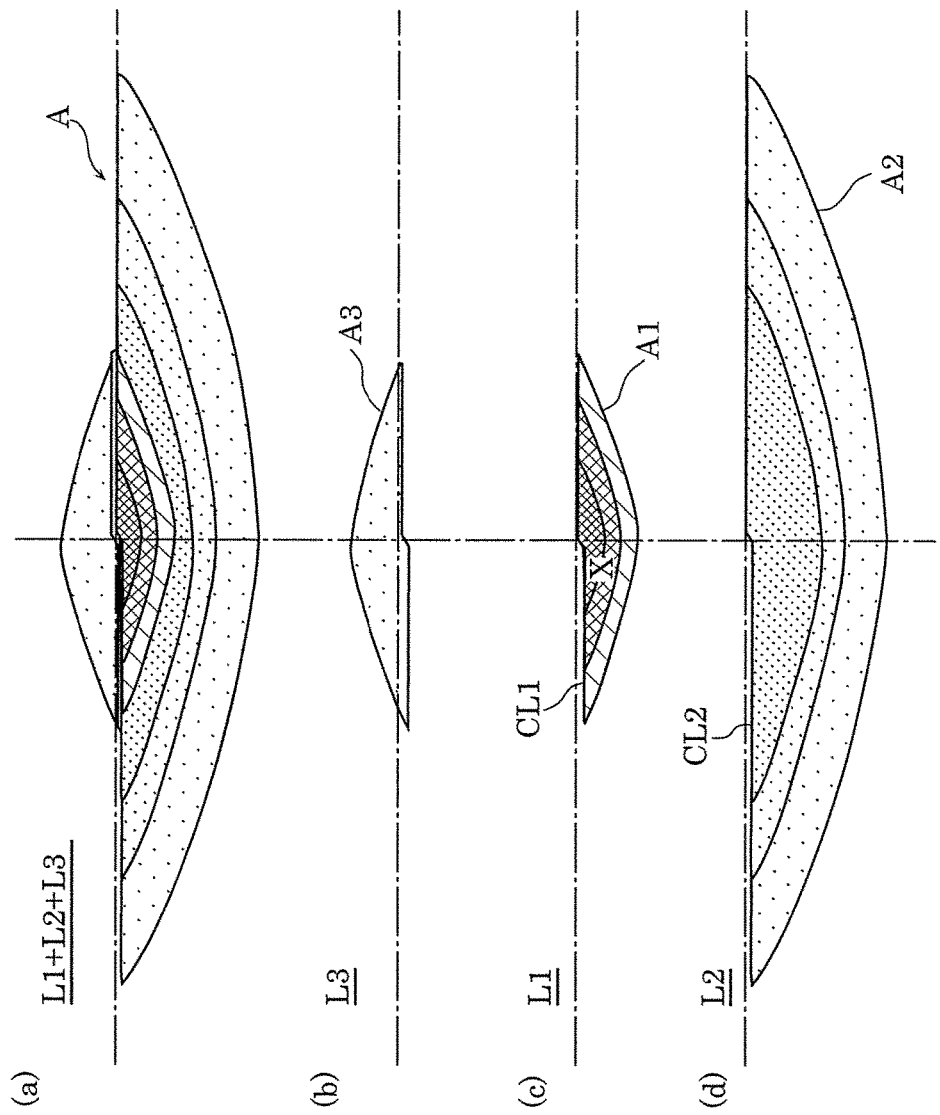

HEADLAMP AND MOBILE OBJECT

CROSS REFERENCE TO RELATED APPLICATION

This application claims the benefit of priority of Japanese Patent Application Number 2015-238021 filed on Dec. 4, 2015, the entire content of which is hereby incorporated by reference.

BACKGROUND

1. Technical Field

The present disclosure relates to a headlamp and a mobile object including the headlamp.

2. Description of the Related Art

Vehicles such as automobiles are equipped with lamps in the front such as headlamps. A headlamp includes, for example, a light emitting device, a reflector that reflects light from the light emitting device forward, and a projection lens that is disposed in front of the light emitting device so as to transmit the light reflected by the reflector (for example, see Japanese Unexamined Patent Application Publication No. 2010-118203).

SUMMARY

However, with the above-described conventional headlamp, there is a problem that light projected immediately ahead on the road is bright so as to cause glare and light that reaches far ahead on the road is dim. When the road immediately ahead is bright, the road far ahead appears relatively darker to the driver. Consequently, there is concern that pedestrians or an oncoming vehicle, for example, will be noticed by the driver too late, interfering with safe driving.

In light of this, the present disclosure has an object to provide a headlamp and a mobile object including the headlamp capable of reducing glare in near regions and projecting light far ahead.

In order to achieve the above object, according to one aspect of the present disclosure, a headlamp that projects light forward includes: a light source; a reflector disposed in a path of light from the light source; and a first lens body and a second lens body that are disposed farther forward than the light source and the reflector. The reflector reflects first light toward the first lens body and reflects second light toward the second lens body, the first light being a first portion of the light from the light source and the second light being a second portion of the light from the light source. The first lens body transmits and projects, to a first region, the first light reflected by the reflector. The second lens body transmits and projects, to a second region, the second light reflected by the reflector, the second region being larger than the first region and including a region closer to the headlamp than the first region. The first light is higher in luminous intensity than the second light.

Moreover, according to one aspect of the present disclosure, a mobile object includes the headlamp and a vehicle body including the headlamp installed in a front portion of the vehicle body.

Accordingly, the headlamp and mobile object can reduce glare in near regions and project light far ahead.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a top view of a shield and a lens according to the embodiment;

FIG. 7 illustrates projection regions illuminated by the low beam generated by the headlamp according to the embodiment;

DETAILED DESCRIPTION OF THE EMBODIMENT

Figure 1:
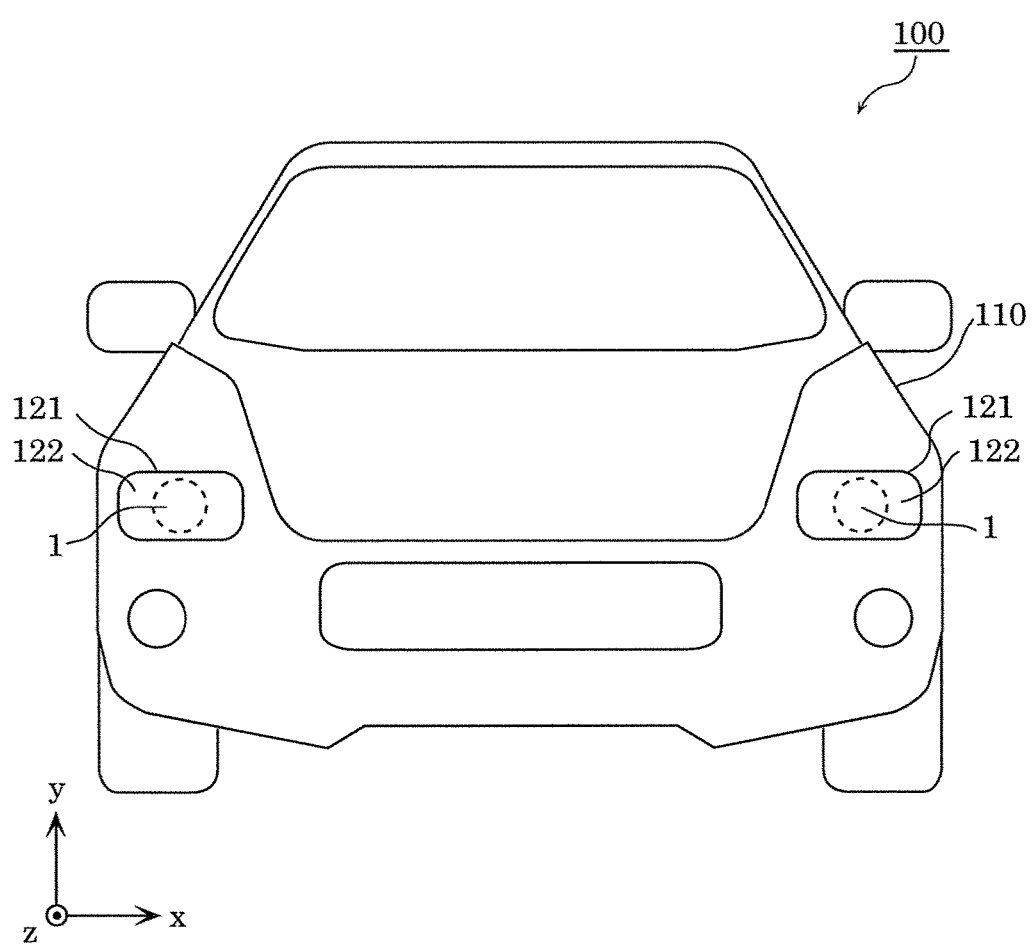
FIG. 1 is a front view of an automobile including a headlamp according to the embodiment.

The following describes a headlamp and a mobile object according to an embodiment of the present disclosure with reference to the drawings. Note that the embodiment described below shows a specific example of the present disclosure. The numerical values, shapes, materials, elements, the arrangement and connection of the elements, steps, order of the steps, etc., indicated in the following embodiment are mere examples, and therefore do not intend to limit the inventive concept. Therefore, among the elements in the following embodiment, those not recited in any of the independent claims defining the most generic part of the inventive concept are described as optional elements.

As described herein, "front" and "forward" refer to the direction in which light is emitted from the headlamp (i.e., the light emitting direction) and the light-extraction direction in which light is extracted (i.e., the lighting direction), and "back" and "rearward" refer to the direction opposite the direction to which "front" and "forward" refer. Moreover, "front" and "forward" refer to the direction of travel when the mobile object moves forward, "right" and "left" are from the perspective of the driver of the mobile object when facing forward, "up" refers to the direction toward the ceiling of the mobile object, and "down" and "downward" refer to the direction opposite the direction to which "up" refers.

The Z axis corresponds to the front and back directions, the Y axis corresponds to the up and down (vertical) directions, and the X axis corresponds to the left and right (horizontal, lateral) directions. In other words, in the following embodiment, "forward," which is the direction in which light is emitted from the headlamp, corresponds to the positive direction along the Z axis.

Note that the drawings are represented schematically and are not necessarily precise illustrations. Additionally, like reference signs indicate like elements in the drawings. Moreover, in the following embodiment, the term "approximately," such as in "approximately the same", "approximately matches," or "approximately coincident", is used. For example, in addition to meaning exactly the same, "approximately the same" means essentially equal, i.e., includes deviations of about a few percent, for example. This applies to other phrases where "approximately" is used as well.

Embodiment (Automobile (Mobile Object))

First, automobile 100 according to an embodiment will be described with reference to FIG. 1. FIG. 1 is a front view of automobile 100 according to an embodiment.

Automobile 100 is one example of a mobile object, such as a four-wheeled automobile. Automobile 100 is, for example, an automobile propelled by a gasoline engine, an automobile propelled by an electric motor, or a hybrid automobile.

As illustrated in FIG. 1, automobile 100 includes headlamp 1 and vehicle body 110. Headlamp 1 is attached to the front of vehicle 110. More specifically, automobile 100 includes two headlamps 1, one disposed on each of the left and right sides of the front of vehicle body 110. In this embodiment, automobile 100 further includes an engine control unit (ECU) (not illustrated in the drawings).

As illustrated in FIG. 1, vehicle body 110 includes housing 121 and front cover 122. In this embodiment, one housing 121 and one front cover 122 is disposed on each of the left and right sides of the front of vehicle body 110.

Housing 121 is, for example, a metal chassis and has an opening through which light emitted from headlamp 1 exits. Front cover 122 is a light-transmissive headlamp cover and is disposed at the opening of housing 121. Housing 121 and front cover 122 are sealed together to prevent water or dust, for example, from entering housing 121.

Headlamp 1 is a lamp that projects light forward, and in this embodiment, is a headlight installed on a mobile object (i.e., a vehicle headlamp). Headlamp 1 is disposed behind front cover 122 and attached to housing 121. Light projected by headlamp 1 exits through front cover 122.

(Headlamp)

Next, headlamp 1 according to this embodiment will be described in detail with reference to FIG. 2 through FIG. 4.

Figure 2:
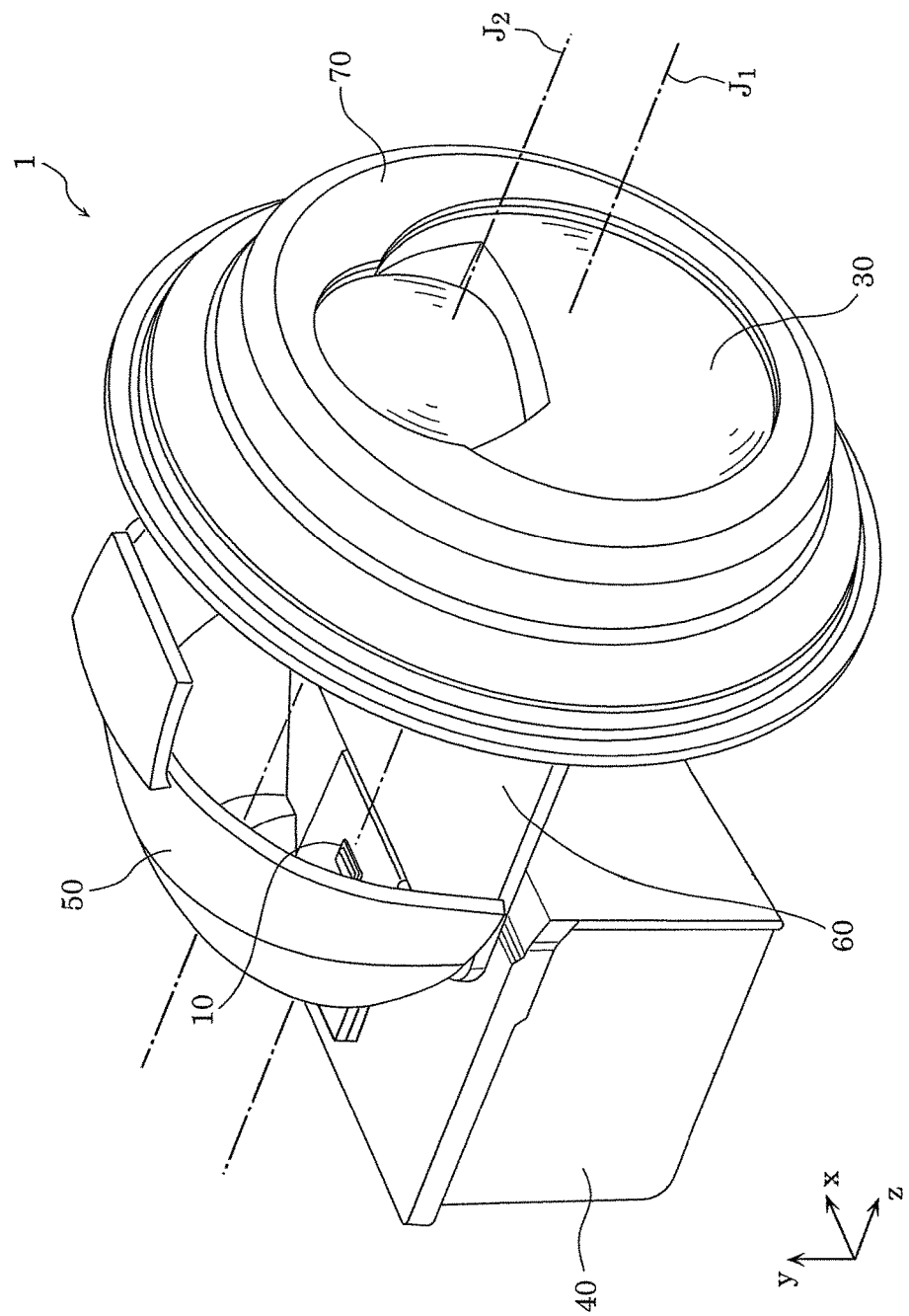
FIG. 2 is a perspective view of the headlamp according to the embodiment.
Figure 3:
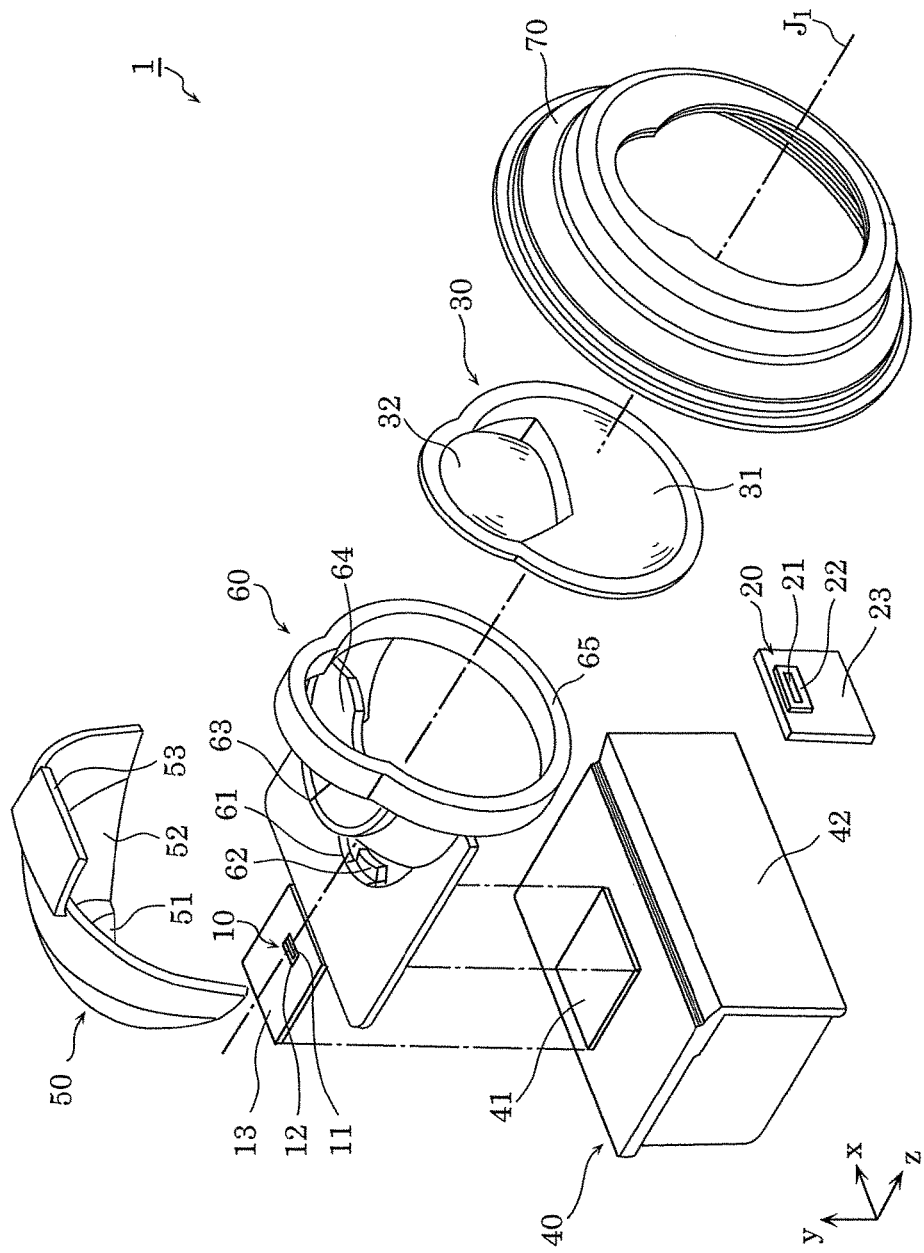
FIG. 3 is an exploded perspective view of the headlamp according to the embodiment.
Figure 4:
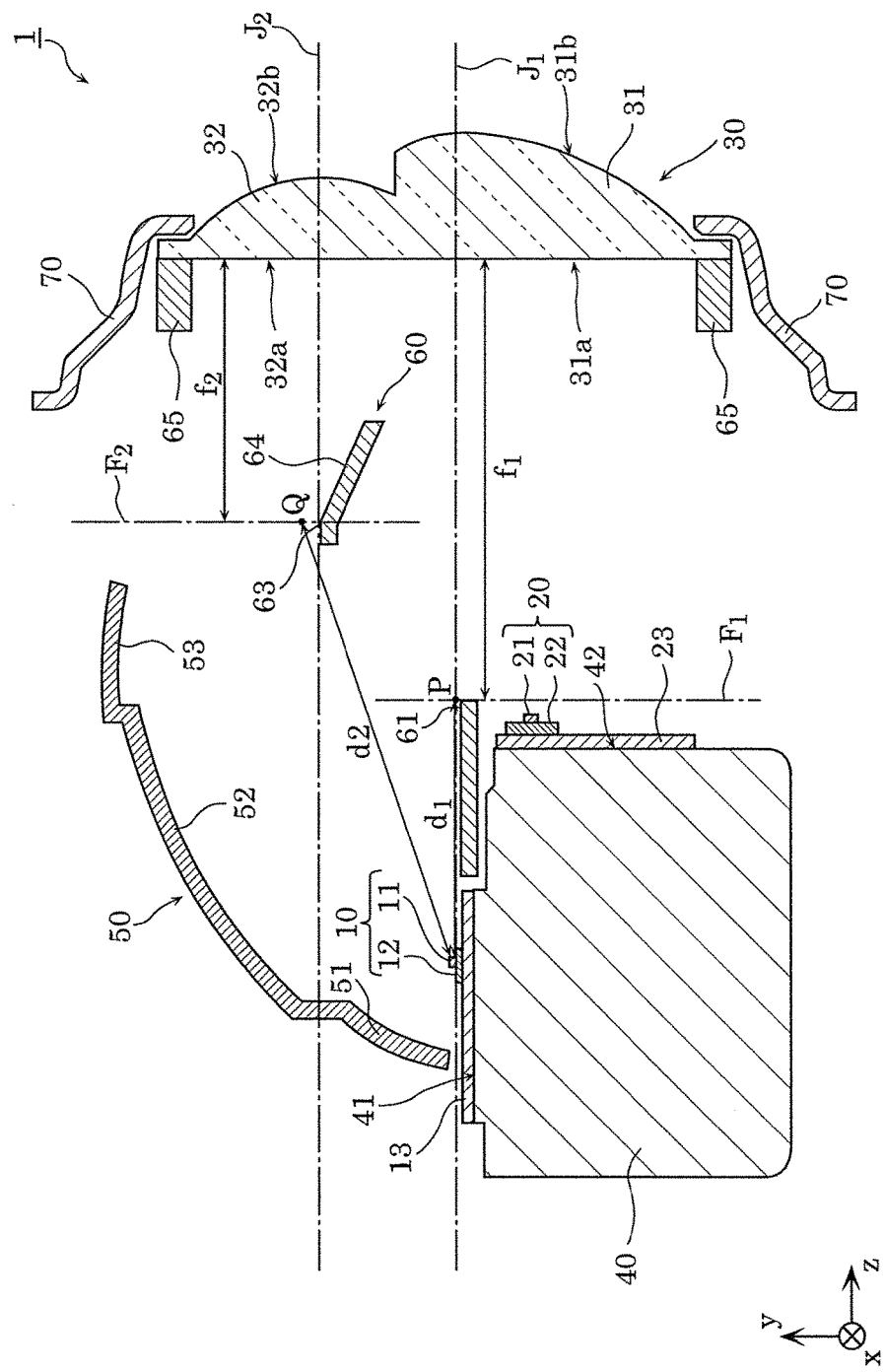
FIG. 4 is an end elevation of the headlamp according to the embodiment.

FIG. 2 is a perspective view of headlamp 1 according to this embodiment, FIG. 3 is an exploded perspective view of headlamp 1 according to this embodiment, and FIG. 4 is an end elevation of headlamp 1 according to this embodiment. FIG. 4 illustrates a vertical cross section (YZ cross section) taken down the center of headlamp 1. More specifically, FIG. 4 is a cross section taken along the optical axis of low beam light source module 10, and along central axis $J_1$ of first lens body 31 and central axis $J_2$ of second lens body 32 included in lens 30 of headlamp 1.

As illustrated in FIG. 2 and FIG. 3, headlamp 1 includes low beam light source module 10, high beam light source module 20, lens 30, heat dissipating element 40, reflector 50, shield 60, and frame 70. Although not illustrated in the drawings, headlamp 1 further includes a lighting controller that controls low beam light source module 10 and high beam light source module 20.

Headlamp 1 is an integrated lamp capable of emitting a high beam, which is a driving beam, and a low beam, which is a passing beam. The high beam illuminates a region far ahead of automobile 100, and the low beam illuminates a region forward and downward of automobile 100.

In this embodiment, when viewed from the front (i.e., from a position on the positive side of the Z axis), headlamp 1 fits within a predetermined circular region. More specifically, low beam light source module 10, high beam light source module 20, lens 30, heat dissipating element 40, reflector 50, shield 60, and frame 70 form a unit that fits within a predetermined circular region when viewed from a position on the positive side of the Z axis. The predetermined circular region is, for example, 70 mm in diameter.

Note that headlamp 1 according to this embodiment is exemplified as a lighting device installed on automobile 100 configured for roads where the driving lane (i.e., the lane in which the driver drives his or her own vehicle) is the right lane and the oncoming traffic lane is the left lane relative to the direction of travel, such as in the United States of America. However, headlamp 1 may be installed on an automobile configured for roads where the driving lane is the left lane and the oncoming traffic lane is the right lane relative to the direction of travel, such as in Japan. As such, the configuration described below may be reversed left and right.

Hereinafter, each element of headlamp 1 will be described in detail.

(Low Beam Light Source Module)

Low beam light source module 10 is one example of a light source that emits light for short-distance illumination. More specifically, low beam light source module 10 is a light emitting diode (LED) module for generating a low beam and is turned on when an area (more specifically, when the road surface) forward and downward of automobile 100 is to be illuminated.

Low beam light source module 10 is a white light source and is, for example, a B-Y type white light LED light source, which emits white light using a yellow phosphor and a blue light LED chip that emits blue light. Alternatively, low beam light source module 10 may be a white light LED light source that emits white light using LED chips that emit blue, red, and green light, for example.

As illustrated in FIG. 3 and FIG. 4, low beam light source module 10 includes low beam light emitting device 11 and substrate 12 on which low beam light emitting device 11 is mounted. Low beam light source module 10 may be a surface mount device (SMD) module, and may be a chip on board (COB) module.

When low beam light source module 10 is an SMD module, low beam light emitting device 11 is an SMD LED device that has an LED chip (bare chip) mounted and sealed with a sealant (phosphor-containing resin) in a resin package. When low beam light source module 10 is a COB module, low beam light emitting device 11 is an LED chip (bare chip) itself, and is directly mounted on substrate 12. In this case, the LED chip mounted on substrate 12 is sealed with a sealant such as a phosphor-containing resin.

Low beam light source module 10 is fixed to heat dissipating element 40. More specifically, as illustrated in FIG. 4, substrate 12 is placed on and fixed to a predetermined placement surface 41 of heat dissipating element 40 with heat dissipating material 13 therebetween. In this embodiment, substrate 12 is disposed lying down (i.e., disposed horizontally) such that low beam light source module 10 emits light upward. In other words, the optical axis of low beam light source module 10 (low beam light emitting device 11) is parallel to the Y axis.

Low beam light emitting device 11 emits light that passes through first lens body 31 and second lens body 32 of lens 30. Low beam light emitting device 11 is thermally coupled to heat dissipating element 40 with substrate 12 and heat dissipating material 13 therebetween.

In a plan view, low beam light emitting device 11 is disposed in a position that overlaps central axis $J_1$ of first lens body 31 and central axis $J_2$ of second lens body 32 of lens 30. In other words, as illustrated in FIG. 4, low beam light emitting device 11 is located in a cross section taken along central axis $J_1$ and central axis $J_2$. More specifically, in the cross section illustrated in FIG. 4, low beam light emitting device 11 is positioned at a focal point (first focal point) of the elliptical arc shape of reflector 50.

Substrate 12 is, for example, a ceramic substrate including, for example, alumina, a resin substrate including resin, or an insulated metal substrate including a metal base covered by a layer of electrically insulating material. Substrate 12 has a plan view shape corresponding to a shape of placement surface 41 of heat dissipating element 40 on which substrate 12 is placed.

Heat dissipating material 13 is, for example, a highly thermally conductive liquid heat-dissipating silicon or a heat dissipating sheet. Heat dissipating material 13 is electrically insulating. Heat dissipating material 13 can efficiently draw heat generated by low beam light source module 10 by transferring the heat to heat dissipating element 40.

(High Beam Light Source Module)

High beam light source module 20 is one example of a light source that emits light for long-distance illumination. More specifically, high beam light source module 20 is a high beam LED module, and is turned on when a region far ahead of automobile 100 is to be illuminated.

High beam light source module 20 is a white light source and is, for example, a B-Y type white light LED light source, which emits white light using a blue light LED chip that emits blue light and a yellow phosphor. Alternatively, high beam light source module 20 may be a white light LED light source that emits white light using LED chips that emit blue, red, and green light, for example.

As illustrated in FIG. 3 and FIG. 4, high beam light source module 20 includes high beam light emitting device 21 and substrate 22 on which high beam light emitting device 21 is mounted. High beam light source module 20 may be an SMD module and, alternatively, may be a COB module. Details regarding the structures of SMD and COB modules are the same as described with respect to low beam light source module 10.

High beam light source module 20 is fixed to heat dissipating element 40. More specifically, as illustrated in FIG. 4, substrate 22 is placed on and fixed to a predetermined placement surface 42 of heat dissipating element 40 with heat dissipating material 23 therebetween. In this embodiment, substrate 22 is disposed standing up (i.e., disposed vertically) such that that high beam light source module 20 emits light forward. In other words, the optical axis of high beam light source module 20 (high beam light emitting device 21) is parallel to the Z axis.

High beam light source module 20 and low beam light source module 10 are fixed to the same heat dissipating element 40. More specifically, high beam light source module 20 and low beam light source module 10 are placed on and fixed to different placement surfaces (placement surface 41 and placement surface 42) of heat dissipating element 40. Placement surface 41 and placement surface 42 are perpendicular to one another.

High beam light emitting device 21 emits light that passes through first lens body 31 of lens 30. High beam light emitting device 21 is thermally coupled to heat dissipating element 40 with substrate 22 and heat dissipating material 23 therebetween.

High beam light emitting device 21 is disposed farther forward than low beam light emitting device 11. Moreover, for example, high beam light emitting device 21 is positioned below central axis $J_1$ of first lens body 31 and below low beam light emitting device 11.

Substrate 22 is, for example, a ceramic substrate including, for example, alumina, a resin substrate including resin, or an insulated metal substrate including a metal base covered by a layer of electrically insulating material. Substrate 22 has a plan view shape corresponding to a shape of placement surface 42 of heat dissipating element 40 on which substrate 22 is placed.

Heat dissipating material 23 is, for example, a highly thermally conductive liquid heat-dissipating silicon or a heat dissipating sheet. Heat dissipating material 23 is electrically insulating. Heat dissipating material 23 can efficiently draw heat generated by high beam light source module 20 by transferring the heat to heat dissipating element 40.

(Lens)

Lens 30 is disposed farther forward than low beam light source module 10 and reflector 50. Lens 30 is disposed between and fixed in place by frame 70 and shield 60.

Lens 30 includes first lens body 31 and second lens body 32. In this embodiment, first lens body 31 and second lens body 32 are integrally formed (as a single unit). First lens body 31 and second lens body 32 are, for example, formed via injection molding using a light-transmissive resin such as acrylic (PMMA), polycarbonate (PC), or a cyclic olefin resin. Note that first lens body 31 and second lens body 32 may be formed as separate lenses (separate units).

First lens body 31 and second lens body 32 have different shapes and have different light distributing characteristics. First lens body 31 and second lens body 32 transmit and project light from low beam light source module 10.

More specifically, first lens body 31 projects light L1 (first light) that illuminates first region A1, which is a narrow region far ahead of automobile 100. Second lens body 32 projects light L2 (second light) that illuminates second region A2, which is a wide region near and in front of automobile 100. Second lens body 32 also projects light L3 (third light) that illuminates third region A3, which is a region farther ahead of automobile 100 than second region A2. Note that specifics regarding the light paths for light L1, L2 and L3, and the specifics regarding regions A1, A2 and A3, will be discussed later with reference to FIG. 6A through FIG. 6C and FIG. 7.

Moreover, first lens body 31 transmits and projects, to a fourth region farther ahead of automobile 100 than first region A1, light from high beam light source module 20. In other words, in this embodiment, lens 30 projects both a low beam and a high beam.

First lens body 31 and second lens body 32 are segments of spheres or ellipsoids. In this embodiment, as illustrated in FIG. 4, surface of incidence 31a of first lens body 31 and surface of incidence 32a of second lens body 32 are flat and flush with one another. Exit surface 31b of first lens body 31 and exit surface 32b of second lens body 32 are segments of spherical or ellipsoid surfaces. Exit surface 31b is disposed farther forward than exit surface 32b.

As illustrated in FIG. 2 and FIG. 3, in a front view, lens 30 has a shape defined by two partially overlapping circles of different diameters (a large circle and a small circle). First lens body 31 has, in a front view, a shape of a circle (large circle) with the forward portion of second lens body 32 removed therefrom. Second lens body 32 has, in a front view, a shape of a circle (small circle) with a section cut away by a straight line. More specifically, second lens body 32 has, in a front view, a shape of a circular segment defined by a central angle greater than 180 degrees.

Central axis $J_1$ of first lens body 31 corresponds with a virtual line that is perpendicular to surface of incidence 31a and passes through the forwardmost end of first lens body 31. Central axis $J_2$ of second lens body 32 corresponds with a virtual line that is perpendicular to surface of incidence 32a and passes through the forwardmost end of second lens body 32. Central axis $J_1$ and central axis $J_2$ are positioned in the approximately central region of headlamp 1 in a side-to-side direction (i.e., along the X axis). Thus, the plane through which central axis $J_1$ and central axis $J_2$ pass (the YZ plane) is the plane of the cross section illustrated in FIG. 4, and corresponds to a reference plane that divides headlamp 1 into right and left halves.

In a front view of headlamp 1, the left side of the reference plane corresponds to the front left of automobile 100, which corresponds to the oncoming traffic lane side (American standard). In a front view of headlamp 1, the right side of the reference plane corresponds to the front right of automobile 100, which corresponds to the driving lane side (American standard).

Focal length $f_1$ of first lens body 31 is the distance from surface of incidence 31a to focal plane $F_1$. Focal length $f_2$ of second lens body 32 is the distance from surface of incidence 32a to focal plane $F_2$. In this embodiment, focal length $f_1$ of first lens body 31 is longer than focal length $f_2$ of second lens body 32, as illustrated in FIG. 4. First lens body 31 with the longer focal length $f_1$ has a small projection magnification, which yields a narrow distribution of light that is projected far ahead. Second lens body 32 with the shorter length $f_2$ has a large projection magnification, which yields a wide distribution of light that is projected both far ahead and near automobile 100.

(Heat Dissipating Element)

Heat dissipating element 40 is a heat dissipating component for dissipating and releasing out (to the atmosphere) heat generated by low beam light source module 10 and high beam light source module 20. As such, heat dissipating element 40 includes, for example, a material with a high rate of heat transfer, such as metal. More specifically, heat dissipating element 40 is, for example, an aluminum die cast element including composite aluminum. Heat dissipating element 40 includes a plurality of heat dissipating fins.

As illustrated in FIG. 3 and FIG. 4, heat dissipating element 40 includes placement surface 41 and placement surface 42.

Placement surface 41 is, for example, one outer surface of heat dissipating element 40 that is parallel to central axis $J_1$ and central axis $J_2$. More specifically, placement surface 41 is a portion of the top surface of heat dissipating element 40 and low beam light source module 10 is placed on placement surface 41 such that light is emitted from low beam light source module 10 in an upward direction.

Placement surface 42 is, for example, one outer surface of heat dissipating element 40 that is perpendicular to central axis $J_1$ and central axis $J_2$. More specifically, placement surface 42 is a portion of a side surface of heat dissipating element 40 and high beam light source module 20 is placed on placement surface 42 such that light is emitted from high beam light source module 20 in a forward direction.

(Reflector)

Reflector 50 is disposed in a path of light from low beam light source module 10. Reflector 50 reflects light L1, which is a portion of light from low beam light source module 10, toward first lens body 31 (see FIG. 6A). Reflector 50 reflects light L2, which is a portion of light from low beam light source module 10, toward second lens body 32 (see FIG. 6B). Reflector 50 reflects light L3, which is a portion of light from low beam light source module 10, toward shield 60 (see FIG. 6C).

More specifically, as illustrated in FIG. 3, reflector 50 includes first reflector section 51, second reflector section 52, and third reflector section 53. In this embodiment, first reflector section 51, second reflector section 52, and third reflector section 53 are integrally formed (as a single unit).

Reflector 50 is, for example, formed by resin molding using a heat resistant resin, and a reflective film is formed on the surface of reflector 50. For example, polycarbonate can be used as the heat resistant resin. Alternatively, instead of a heat resistant resin, fiber reinforced plastic (FRP) or a bulk molding compound (BMC) may be used. The reflective film is, for example, a metal deposition film such as an aluminum deposition film. The reflective film specularly reflects light from low beam light source module 10. Note that at least one of first reflector section 51, second reflector section 52, and third reflector section 53 may be formed as a separate unit (as a separate component).

First reflector section 51 reflects light L1 toward first lens body 31. First reflector section 51 is disposed at the bottom and back end of reflector 50. In this embodiment, first reflector section 51 is disposed between central axis $J_1$ and central axis $J_2$, as illustrated in FIG. 4.

First reflector section 51 has, in a cross section taken along the optical axis of low beam light source module 10 (YZ cross section), a shape of an elliptical arc. More specifically, in the cross section illustrated in FIG. 4, first reflector section 51 has a shape of one elliptical arc or a plurality of elliptical arcs whose ends are connected together. The plurality of elliptical arcs have mutually different interfocal distances. The one elliptical arc or the plurality of elliptical arcs have defining focal point located near low beam light source module 10 (low beam light emitting device 11) and the other defining focal point P located near cutoff line forming section 61 of shield 60.

First reflector section 51 has a shape of a parabola in a cross section taken perpendicular to the optical axis of low beam light source module 10 (XZ cross section). The axis of symmetry of the parabola overlaps low beam light source module 10 in a top view. For example, in a top view, the axis of symmetry of the parabola and central axis $J_1$ of first lens body 31 are approximately coincident.

Second reflector section 52 reflects light L2 toward second lens body 32. Second reflector section 52 is disposed in the middle of reflector 50 (between first reflector section 51 and third reflector section 53). In this embodiment, second reflector section 52 is disposed in a location that intersects the optical axis of low beam light source module 10, as illustrated in FIG. 4.

Second reflector section 52 has, in a cross section taken along the optical axis of low beam light source module 10 (YZ cross section), a shape of an elliptical arc. More specifically, in the cross section illustrated in FIG. 4, the reflective surface of second reflector section 52 has a shape of one elliptical arc or a plurality of elliptical arcs whose ends are connected together. The plurality of elliptical arcs have mutually different interfocal distances. The one elliptical arc or the plurality of elliptical arcs have one focal point located near low beam light source module 10 (low beam light emitting device 11). The other defining focal point Q of the one elliptical arc or the plurality of elliptical arcs is located between cutoff line forming section 63 of shield 60 and a position located a predetermined distance above cutoff line forming section 63.

In this embodiment, the interfocal distance of the elliptical arc of first reflector section 51 is shorter than the interfocal distance of the elliptical arc of second reflector section 52. More specifically, among the one or more elliptical arcs defining a shape of first reflector section 51, the greatest interfocal distance $d_1$ is shorter than the shortest interfocal distance $d_2$ among the one or more elliptical arcs defining a shape of second reflector section 52. Note that, as illustrated in FIG. 4, interfocal distance $d_2$ is approximately equal to the distance between low beam light emitting device 11 and cutoff line forming section 63. Interfocal distance $d_1$ is approximately equal to the distance between low beam light emitting device 11 and cutoff line forming section 61.

Second reflector section 52 has a shape of a parabola in a cross section taken perpendicular to the optical axis of low beam light source module 10 (XZ cross section). The axis of symmetry of the parabola overlaps low beam light source module 10 in a top view. For example, in a top view, the axis of symmetry of the parabola and central axis $J_2$ of second lens body 32 are approximately coincident.

The reflective surface of second reflector section 52 is larger than the reflective surface of first reflector section 51 and/or the reflective surface of third reflector section 53. Thus, the amount of light L2 reflected by second reflector section 52 among the light emitted by low beam light source module 10 is greater than the amount of light L1 reflected by first reflector section 51 and/or the amount of light L3 reflected by third reflector section 53.

Third reflector section 53 reflects light L3 toward shield 60. Third reflector section 53 is disposed at the top, front end of reflector 50. In this embodiment, third reflector section 53 is disposed above cutoff line forming section 61 of shield 60, as illustrated in FIG. 4. The reflective surface of third reflector section 53 is approximately perpendicular to the optical axis of low beam light source module 10.

Third reflector section 53 has, in a cross section taken along the optical axis of low beam light source module 10 (YZ cross section), a shape of an elliptical arc. More specifically, in the cross section illustrated in FIG. 4, the reflective surface of third reflector section 53 has a shape of one elliptical arc or a plurality of elliptical arcs whose ends are connected together. The plurality of elliptical arcs have mutually different interfocal distances. The one elliptical arc or the plurality of elliptical arcs have one defining focal point located near low beam light source module 10 (low beam light emitting device 11). The other defining focal point of the one elliptical arc or the plurality of elliptical arcs is located near reflective surface 64 of shield 60.

Third reflector section 53 has a shape of a parabola in a cross section taken along the optical axis of low beam light source module 10 (XY cross section). The axis of symmetry of the parabola overlaps low beam light source module 10 in a front view.

Note that the shapes of first reflector section 51, second reflector section 52, and third reflector section 53 are not limited to the above examples. For example, third reflector section 53 may have a plate-like shape with a flat reflective surface.

(Shield)

Shield 60 is disposed between lens 30 and low beam light source module 10. Shield 60 reflects, toward second lens body 32, light L3 reflected by reflector 50. Moreover, shield 60 forms a cutoff line by blocking a portion of light L1 and light L2 reflected by reflector.

FIG. 5 is a top view of shield 60 and lens 30 according to this embodiment. Note that in FIG. 5, reflector 50 is schematically shown in dashed lines for the purpose of illustrating a path of light L from low beam light source module 10.

As illustrated in FIG. 3, shield 60 includes cutoff line forming section 61, shielding section 62, cutoff line forming section 63, reflective surface 64, and lens support section 65.

Cutoff line forming section 61 forms cutoff line CL1 at an edge of a projection region (first region A1) by blocking a portion of light L1 reflected by first reflector section 51 of reflector 50 (see (c) in FIG. 7). Cutoff line CL1 is a predetermined boundary between light and dark regions. As illustrated in FIG. 4, in focal plane $F_1$, cutoff line forming section 61 is disposed in approximately the same position as central axis $J_1$ of first lens body 31.

In a front view, shielding section 62 is disposed below and to the left (driving lane side) of central axis $J_1$ of first lens body 31. More specifically, shielding section 62 is a tab that protrudes from cutoff line forming section 61 in a forward and downward direction relative to cutoff line forming section 61. Shielding section 62 is disposed farther forward than focal plane $F_1$ of first lens body 31.

Shielding section 62 blocks a portion of light L1 reflected by reflector 50. More specifically, shielding section 62 blocks light L transmitted above (in the positive direction along the Y axis) central axis $J_1$ of focal plane $F_1$ and on the driving lane side (in the negative direction along the X axis). Note that, as illustrated in FIG. 5, light L would otherwise be inversely projected by first lens body 31 and reach below the horizon line on the oncoming traffic side of the road. In other words, shielding section 62 blocks light that would otherwise reach regions below the horizon line on the oncoming traffic side of the road (more specifically, regions around the "X" in (c) in FIG. 7).

Cutoff line forming section 63 forms cutoff line CL2 at an edge of a projection region (second region A2) by blocking a portion of light L2 reflected by second reflector section 52 of reflector 50 (see (d) in FIG. 7). Note that cutoff lines CL1 and CL2 formed by cutoff line forming section 61 and cutoff line forming section 63 have the same shape. As illustrated in FIG. 4, in focal plane $F_2$, cutoff line forming section 63 is disposed in approximately the same position as central axis $J_2$ of second lens body 32.

Reflective surface 64 reflects, toward second lens body 32, light L3 reflected by third reflector section 53 of reflector 50. Reflective surface 64 is curved into a shape of a mortar.

Lens support section 65 supports lens 30 by sandwiching lens 30 with frame 70. Lens support section 65 is formed into an approximately circular ring shape that follows the outer shape of lens 30. Shield 60 and lens 30 can be appropriately positioned by abutting lens support section 65 to lens 30.

Shield 60 is, for example, formed using a heat resistant resin or fiber reinforced plastic, similar to reflector 50. The surface of shield 60 has formed thereon a reflective film such as an aluminum deposition film. Note that the reflective film may be formed on only a portion of the surface of shield 60. For example, it is sufficient if the reflective film is formed on cutoff line forming sections 61 and 63, the top surface of shielding section 62, and reflective surface 64. Note that shield 60 may be formed by processing a plate of aluminum.

Moreover, cutoff line forming section 61, shielding section 62, cutoff line forming section 63, reflective surface 64, and lens support section 65 are not required to be integrally formed. For example, cutoff line forming section 61 and shielding section 62, cutoff line forming section 63 and reflective surface 64 may be formed as separate units. Alternatively, for example, shield 60 and heat dissipating element 40 may be integrally formed (as a single unit).

(Frame)

Frame 70 supports lens 30 by sandwiching lens 30 with shield 60. In a front view, the outer perimeter of frame 70 is approximately circular, and the inner perimeter is approximately a circular ring, which is the front view shape of lens 30 (a shape defined by a large circle and a small circle partially overlapping one another). The outer perimeter of frame 70 approximately matches the outer shape of headlamp 1 in a front view. In other words, in a front view, the elements included in headlamp 1 are disposed so as to be within the outer perimeter of frame 70. Note that a portion of the fins of heat dissipating element 40 may protrude from frame 70.

For example, frame 70 includes, but is not limited to, a resin material. Frame 70 may include a metal.

(Low Beam Light Distribution)

Next, paths of low beam light emitted by headlamp 1 will be described with reference to FIG. 6A through FIG. 6C and FIG. 7.

Figure 6A:
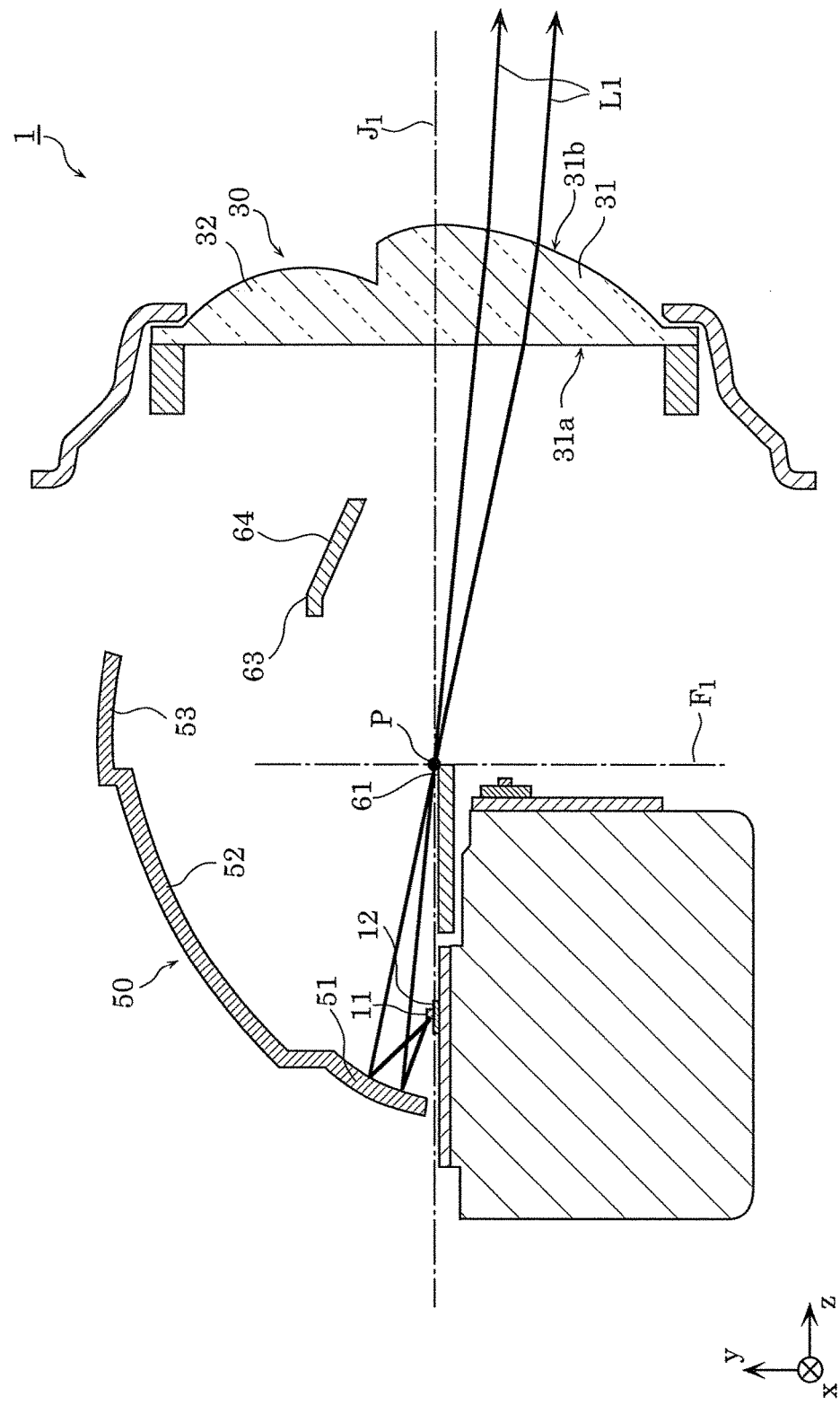
FIG. 6A illustrates paths of first light among the low beam generated by the headlamp according to the embodiment to a narrow region far ahead of the automobile.
Figure 6B:
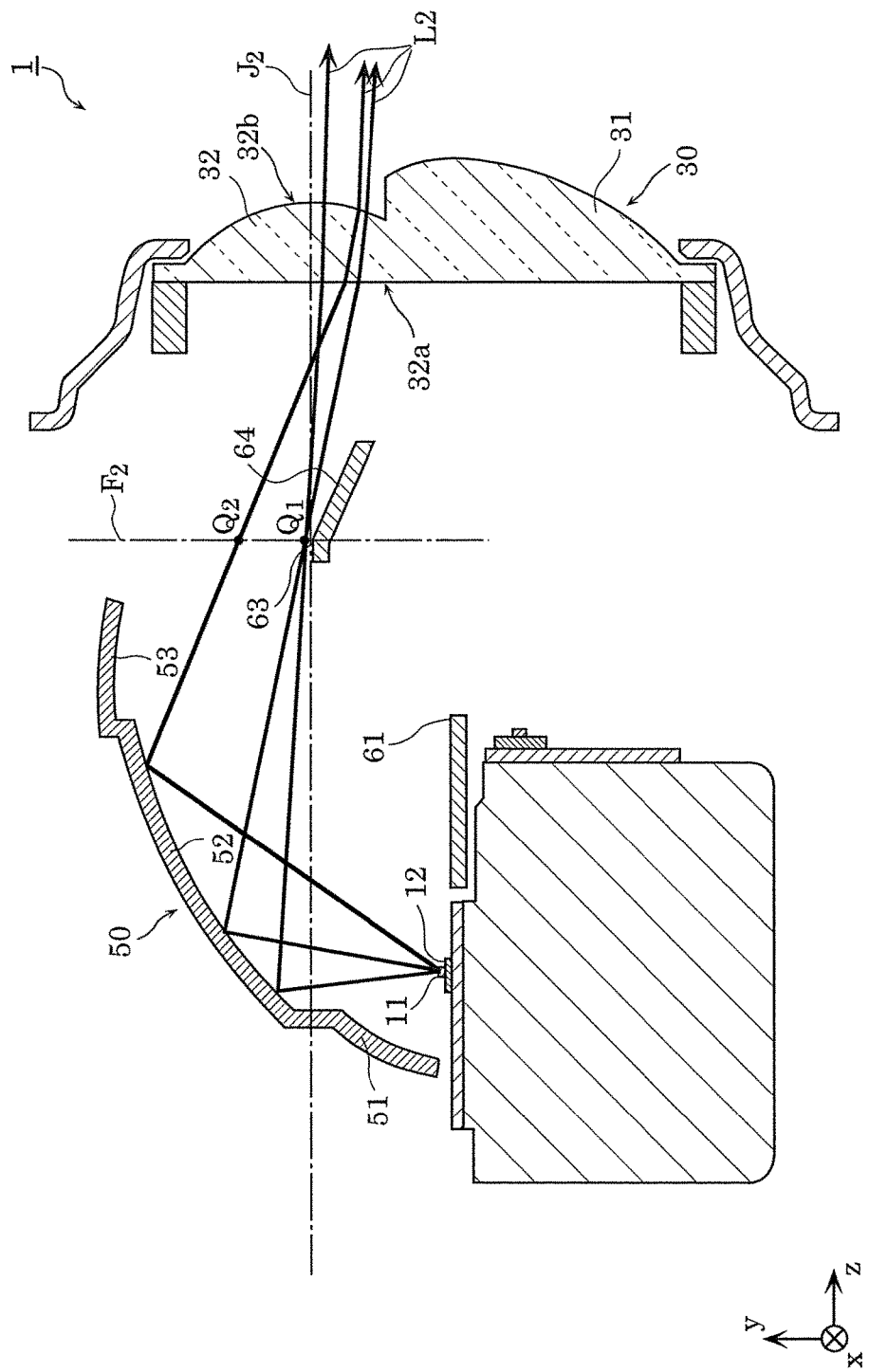
FIG. 6B illustrates paths of second light among the low beam generated by the headlamp according to the embodiment to a wide region near the automobile.
Figure 6C:
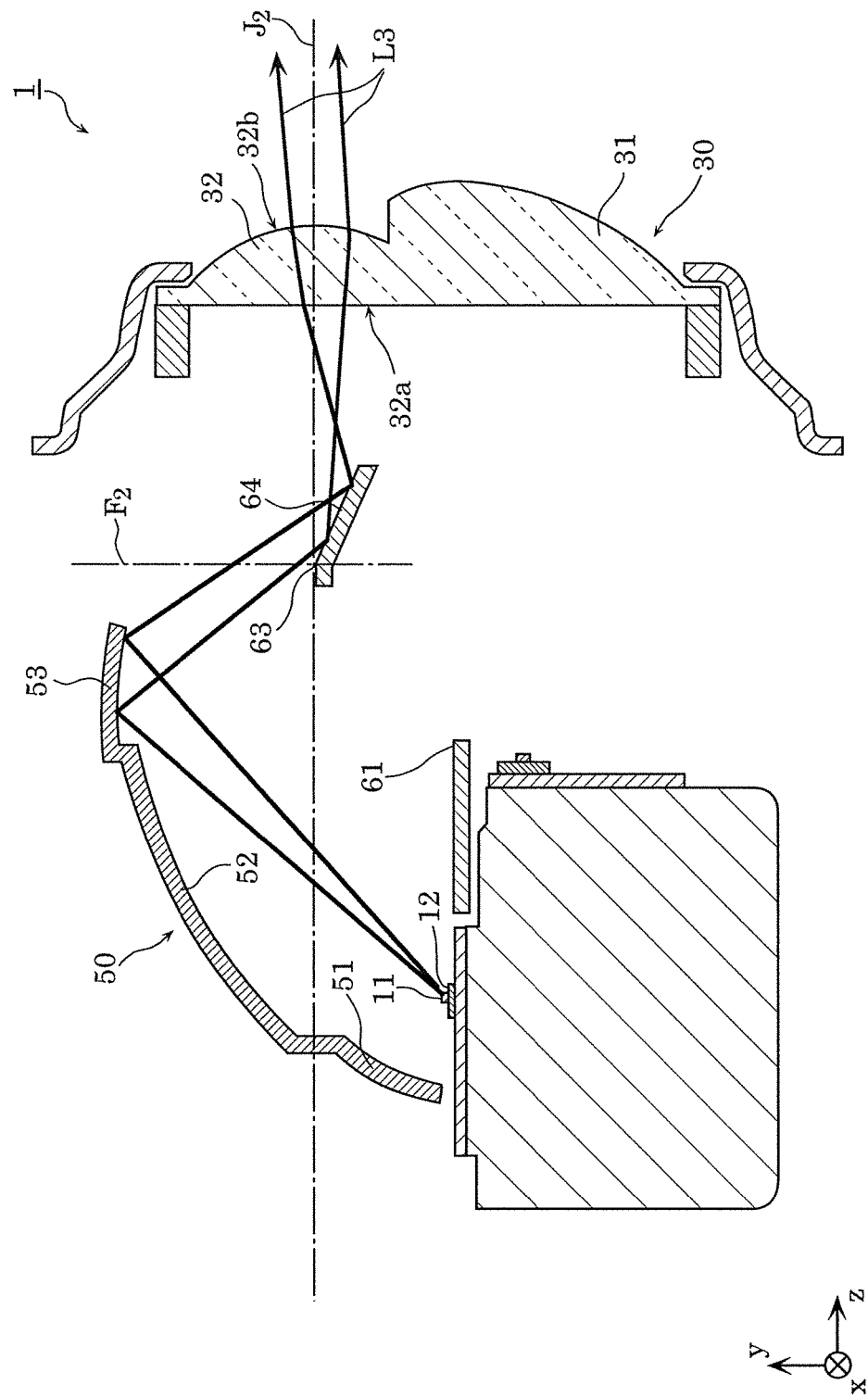
FIG. 6C illustrates paths of third light among the low beam generated by the headlamp according to the embodiment to an upper region.

FIG. 6A illustrates paths of light L1, which is part of the low beam emitted by headlamp 1 according to this embodiment and illuminates first region A1, which is a narrow region far ahead of automobile 100. FIG. 6B illustrates paths of light L2, which is part of the low beam emitted by headlamp 1 according to this embodiment and illuminates second region A2, which is a wide region near and in front of automobile 100. FIG. 6C illustrates paths of light L3, which is part of the low beam emitted by headlamp 1 according to this embodiment and illuminates third region A3, which is an upper region. FIG. 7 illustrates composite projection region A illuminated by the low beam from headlamp 1 according to this embodiment.

Here, FIG. 7 schematically illustrates distributions of light (luminous intensity) when, for example, a screen set up a predetermined distance (for example, 25 meters) in front of headlamp 1 is illuminated. In FIG. 7, the dotted and dashed line drawn vertically in the drawing is a line that intersects an extension of central axis $J_1$ and central axis $J_2$ of headlamp 1, and indicates the position of the front of automobile 100. In (a) through (d) in FIG. 7, the dotted and dashed lines drawn horizontally in the drawing indicate the horizon.

In this embodiment, low beam light source module 10 emits light having a predetermined light distribution angle. In other words, when low beam light source module 10 is turned on, low beam light source module 10 emits light L1, light L2, and light L3 at the same time. Accordingly, when low beam light source module 10 is turned on, low beam light source module 10 forms projection region A as illustrated in (a) in FIG. 7. Projection region A is a composite of first region A1, second region A2, and third region A3 illustrated in (b) through (d) in FIG. 7.

First, light L1 will be described with reference to FIG. 6A.

As illustrated in FIG. 6A, light L1 emitted from low beam light emitting device 11 toward first reflector section 51 of reflector 50 reflects off first reflector section 51 and travels toward first lens body 31 of lens 30. Light L1 is then incident on surface of incidence 31a of first lens body 31, travels through first lens body 31, and exits from exit surface 31b.

As illustrated in FIG. 6A, light L1 travels from first reflector section 51 to surface of incidence 31a at a small angle relative to central axis $J_1$ of first lens body 31. In other words, light L1 is incident on first lens body 31 at a location near central axis $J_1$. With this, since the portion of first lens body 31 near central axis $J_1$ produces little chromatic aberration, chromatic unevenness in light L1 can be reduced.

First region A1 illuminated by light L1 is illustrated in (c) in FIG. 7. Note that the top end of first region A1 is defined by cutoff line CL1 formed by cutoff line forming section 61.

First lens body 31 magnifies, by a predetermined projection magnification, and inversely projects forward light L1 that passes through focal plane $F_1$. As described above, projection magnification is determined in accordance with the focal length of the lens body. In this embodiment, since focal length $f_1$ of first lens body 31 is longer than focal length $f_2$ of second lens body 32, first region A1 is smaller than second region A2 (see (d) in FIG. 7) both vertically and horizontally. In other words, first region A1 is narrower than second region A2.

Moreover, in (c) in FIG. 7, the different densities of diagonal criss-crossed shading schematically indicate different luminous intensities. In first region A1, luminous intensity increases toward the center and decreases toward the perimeter. In this embodiment, the luminous intensity of light L1 is greater than the luminous intensity of light L2. More specifically, luminous intensity is the greatest in the central region of first region A1 at, for example, 40000 [cd] or higher. This luminous intensity is 10 times or more than the (average) luminous intensity of light L2.

Note that a portion of light L1 (light L in FIG. 5) is blocked by shielding section 62 of shield 60. More specifically, shielding section 62 blocks light that would otherwise reach regions below the horizon line on the oncoming traffic side of the road (regions around the "X" in (c) in FIG. 7). The luminous intensity in that region is therefore reduced, making it possible to inhibit light with a high luminous intensity from being projected onto oncoming traffic.

Next, light L2 will be described with reference to FIG. 6B.

As illustrated in FIG. 6B, light L2 emitted from low beam light emitting device 11 toward second reflector section 52 of reflector 50 reflects off second reflector section 52 and travels toward second lens body 32 of lens 30. Light L2 is then incident on surface of incidence 32a of second lens body 32, travels through second lens body 32, and exits from exit surface 32b. Note that points $Q_1$ and $Q_2$ illustrated in FIG. 6B are examples of the other defining focal point Q of the elliptical arcs defining the shape of second reflector section 52.

As illustrated in FIG. 6B, light L2 travels from second reflector section 52 to surface of incidence 32a at a small angle relative to central axis $J_2$ of second lens body 32. In other words, light L2 is incident on second lens body 32 at a location near central axis $J_2$. With this, since the portion of second lens body 32 near central axis $J_2$ produces little chromatic aberration, chromatic unevenness in light L2 can be reduced.

Second region A2 illuminated by light L2 is illustrated in (d) in FIG. 7. Note that the top end of second region A2 is defined by cutoff line CL2 formed by cutoff line forming section 63.

Second lens body 32 magnifies, by a predetermined projection magnification, and inversely projects forward light L2 that passes through focal plane $F_2$. In this embodiment, second region A2 is larger than first region A1 both vertically and horizontally. More specifically, second region A2 includes a region closer to automobile 100 than first region A1 and a region wider than first region A1. Note that second region A2 includes first region A1.

Moreover, in (d) in FIG. 7, the different densities of diagonal criss-crossed shading schematically indicate different luminous intensities. In second region A2, luminous intensity increases toward the center and decreases toward the perimeter. Light L2 has a luminous intensity in a range from, for example, 150 candelas [cd] to 5000 [cd].

Next, light L3 will be described with reference to FIG. 6C.

As illustrated in FIG. 6C, light L3 emitted from low beam light emitting device 11 toward third reflector section 53 of reflector 50 reflects off third reflector section 53 and travels toward reflective surface 64 of shield 60. Light L3 then reflects off reflective surface 64 of shield 60 and travels toward second lens body 32. Light L3 is then incident on surface of incidence 32a of second lens body 32, travels through second lens body 32, and exits from exit surface 32b.

As illustrated in FIG. 6C, light L3 travels from reflective surface 64 to surface of incidence 32a at a small angle relative to central axis $J_2$ of second lens body 32. In other words, light L3 is incident on second lens body 32 at a location near central axis $J_2$. With this, since the portion of second lens body 32 near central axis $J_2$ produces little chromatic aberration, chromatic unevenness in light L3 can be reduced.

Third region A3 illuminated by light L3 is illustrated in (b) in FIG. 7. The luminous intensity of light L3 is adequately lower than the luminous intensity of light L1. The luminous intensity of light L3 is, for example, approximately equal to the luminous intensity in peripheral regions of second region A2. More specifically, the luminous intensity of light L3 is, for example, in a range from 125 [cd] to 700 [cd], and is light that faintly illuminates third region A3.

(High Beam Light Distribution)

Next, the configuration for controlling the light distribution of the high beam generated by headlamp 1 according to this embodiment will be described.

Figure 8:
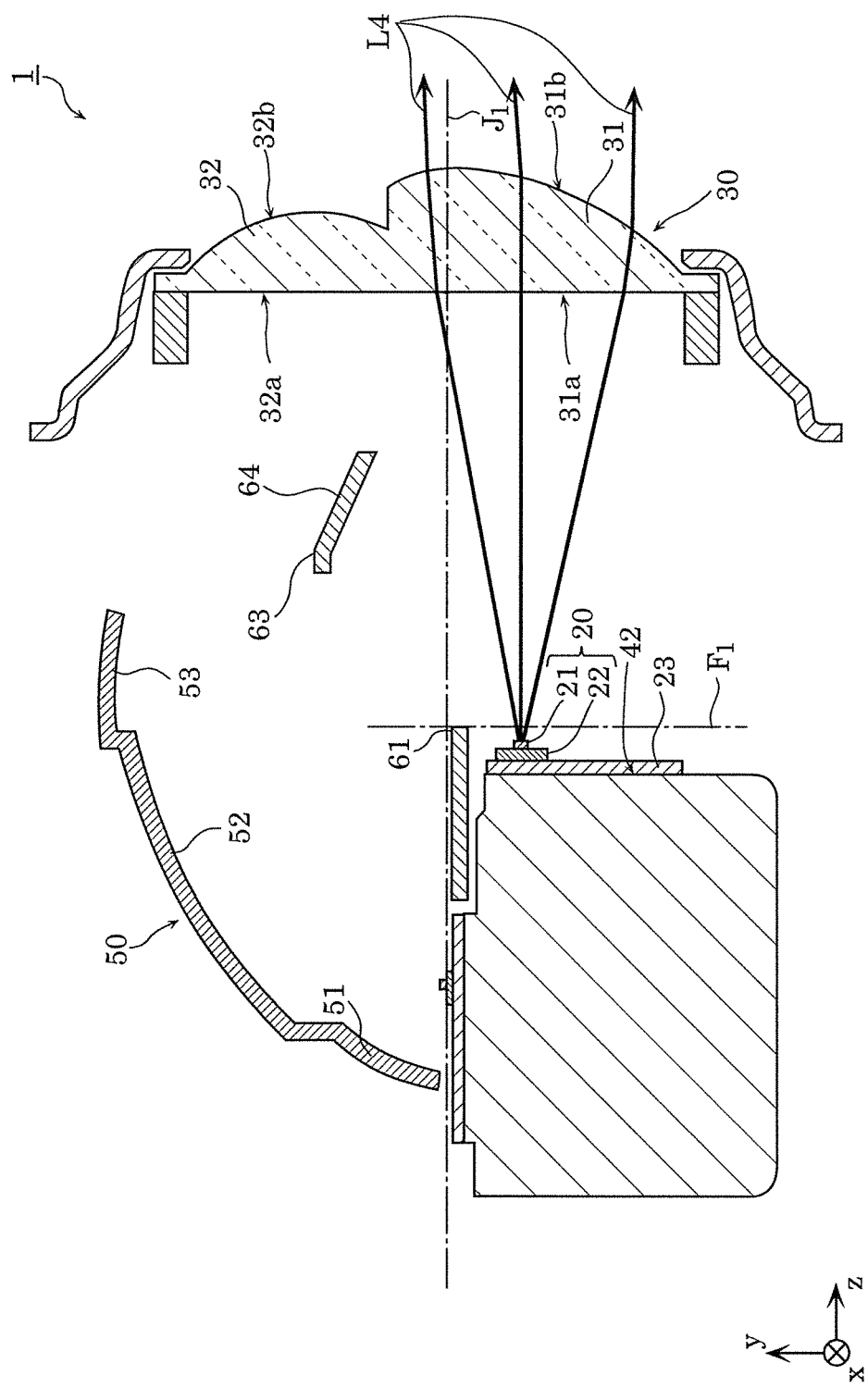
FIG. 8 illustrates paths of high beam light from the headlamp according to the embodiment.
Figure 9:
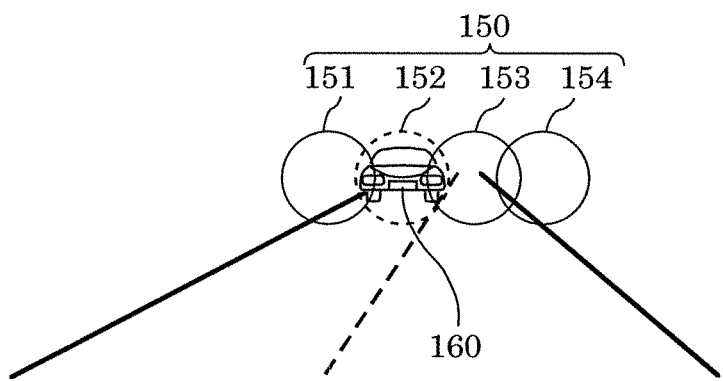
FIG. 9 illustrates a projection region illuminated by the high beam generated by the headlamp according to the embodiment.

FIG. 8 illustrates paths of high beam light from headlamp 1 according to this embodiment. The cross section illustrated in FIG. 8 is the same cross section illustrated in FIG. 4. FIG. 9 illustrates the projection region of the high beam generated by headlamp 1 according to this embodiment.

High beam light source module 20 emits light L4 and is disposed such that its optical axis extends parallel to central axis $J_1$. As illustrated in FIG. 8, light L4 is incident on surface of incidence 31a of first lens body 31, travels through first lens body 31, and exits from exit surface 31b.

In this embodiment, high beam light source module 20 is capable of selectively illuminating subregions 151 through 154 of the projection region (fourth region 150), as illustrated in FIG. 9. More specifically, high beam light source module 20 includes a plurality of high beam light emitting devices 21 that illuminate mutually different subregions.

Figure 10:
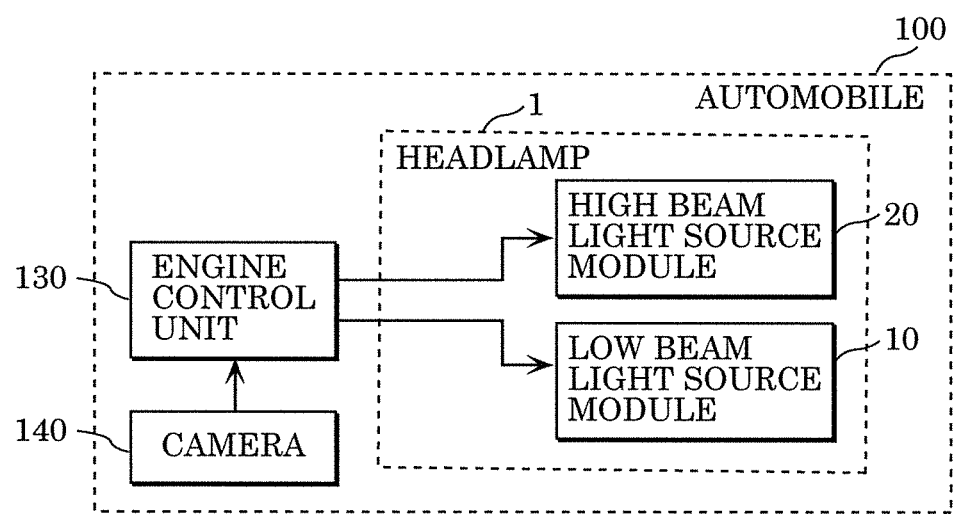
FIG. 10 is a block diagram illustrating a functional configuration of an automobile equipped with the headlamp according to the embodiment.

FIG. 10 is a block diagram illustrating a functional configuration of automobile 100 equipped with headlamp 1 according to this embodiment.

As illustrated in FIG. 10, automobile 100 includes headlamp 1, engine control unit 130, and camera 140. Headlamp 1 includes low beam light source module 10 and high beam light source module 20.

Engine control unit (ECU) 130 controls the engine of automobile 100. Engine control unit 130 is, for example, a microcomputer. Camera 140 and headlamp 1 (low beam light source module 10 and high beam light source module 20) are connected to engine control unit 130.

In this embodiment, engine control unit 130 controls the turning on and off of low beam light source module 10 and high beam light source module 20. For example, engine control unit 130 selectively switches each of the plurality of high beam light emitting devices 21 on and off. More specifically, engine control unit 130 recognizes the position of an object that should not be illuminated with light from an image captured by camera 140. The object is, for example, an oncoming vehicle traveling in the oncoming traffic lane, or a vehicle traveling in the driving lane in front of automobile 100. Engine control unit 130 identifies a subregion corresponding to the position of the object and turns off (or reduces the light output of) high beam light emitting device 21 that illuminates the identified subregion.

Camera 140 is one example of an imaging device that images an area in front of automobile 100. For example, camera 140 is installed on the dashboard of automobile 100 or near the interior rear-view mirror, and images an area in front of automobile 100 (is pointed in the traveling direction of automobile 100). Images captured by camera 140 are output to engine control unit 130.

As illustrated in the example in FIG. 9, the high beam projection region (fourth region 150) is divided into four subregions 151 through 154. Since oncoming vehicle 160 is located in subregion 152, engine control unit 130 turns off high beam light emitting device 21 that illuminates subregion 152. This makes it possible to project light to regions surrounding oncoming vehicle 160 (subregions 151, 153, and 154) and avoid projecting light onto oncoming vehicle 160.

Note that when oncoming vehicle 160 moves to subregion 151, engine control unit 130 turns off high beam light emitting device 21 that illuminates subregion 151 and turns on high beam light emitting device 21 that illuminates subregion 152. In this way, in this embodiment, subregions to be illuminated can be selectively determined in accordance with the location of oncoming vehicle 160.

(Advantageous Effects, Etc.)

As described above, headlamp 1 according to this embodiment is a headlamp that projects light forward and includes: low beam light source module 10; reflector 50 disposed in a path of light from low beam light source module 10; and first lens body 31 and second lens body 32 that are disposed farther forward than low beam light source module 10 and reflector 50. Reflector 50 reflects light L1, which is a portion of the light from low beam light source module 10, toward first lens body 31, and reflects light L2, which is a portion of light from low beam light source module 10, toward second lens body 32. First lens body 31 transmits and projects, to first region A1, light L1 reflected by reflector 50. Second lens body 32 transmits and projects, to second region A2, which is larger than first region A1 and includes a region closer to headlamp 1 than first region A1, light L2 reflected by reflector 50. Light L1 is higher in luminous intensity than light L2. Moreover, for example, automobile 100 according to this embodiment includes headlamp 1 and vehicle body 110 including headlamp 1 installed in a front portion of vehicle body 110.

In this way, first lens body 31 projects light L1 to first region A1, which is a narrow and far region, and second lens body 32 projects light L2 to second region A2, which is wide and near region. Since light L2 is lower in luminous intensity than light L1, glare in near regions can be reduced and light can be projected far ahead. Typically, legal regulations are imposed on headlamps used in vehicles for safety reasons. For example, if the road immediately ahead is too bright, the road far ahead appears relatively darker than it actually is to the driver of automobile 100. For this reason, there are regulations that limit the luminous intensity of the road immediately ahead.

With headlamp 1 according to this embodiment, it possible to reduce luminous intensity in particular in a location slightly below the horizon in front of automobile 100. Furthermore, light L1 projected by first lens body 31 more brightly illuminates a far region. Therefore, since glare in the road immediately ahead is reduced for the driver of automobile 100 and far regions are more brightly illuminated, forward visibility is increased and automobile 100 can be driven safely.

Moreover, for example, focal length $f_1$ of first lens body 31 is longer than focal length $f_2$ of second lens body 32.

Since focal length $f_1$ of first lens body 31 is longer, the projection magnification is lower, resulting in a narrow distribution of light. Since focal length $f_2$ of second lens body 32 is shorter, the projection magnification is higher, resulting in a wide distribution of light. In this way, by designing first lens body 31 and second lens body 32 to have appropriate interfocal distances, narrow and wide distributions of light can be achieved with simple lens shapes.

Moreover, for example, reflector 50 includes: first reflector section 51 that reflects light L1 toward first lens body 31; and second reflector section 52 that reflects light L2 toward second lens body 32. First reflector section 51 and second reflector section 52 each have, in a cross section taken along an optical axis of low beam light source module 10, a shape of an elliptical arc. An interfocal distance of the elliptical arc of first reflector section 51 is shorter than an interfocal distance of the elliptical arc of second reflector section 52.

With this, first reflector section 51 can effectively reflect light L1 toward first lens body 31, and second reflector section 52 can effectively reflect light L2 toward second lens body 32.

Moreover, for example, headlamp 100 further includes shield 60 disposed between second lens body 32 and low beam light source module 10. Reflector 50 further reflects light L3, which is a portion of the light from low beam light source module 10, toward shield 60. Shield 60 reflects, toward second lens body 32, light L3 reflected by reflector 50, and second lens body 32 transmits and projects, to third region A3 above second region A2, light L3 reflected by shield 60.

With this, a billboard or road sign located in front and above automobile 100 can be illuminated, which assists the driver of automobile 100 in driving safely.

Moreover, for example, shield 60 forms cutoff line CL2 defining an edge of second region A2 by blocking a portion of light L2 reflected by reflector 50.

Forming cutoff line CL2 makes it possible to reduce glare for oncoming traffic since light L2 is blocked from illuminating oncoming traffic. With this, safe and smooth driving can be achieved.

Moreover, for example, shield 60 includes shielding section 62 that blocks a portion of light L1 reflected by reflector 50, and in a front view, shielding section 62 is disposed below central axis $J_1$ of first lens body 31 and to one of a left side and right side of central axis $J_1$.

Since light L emitted below the horizon on the oncoming traffic lane side can be blocked, glare can be reduced for oncoming traffic. With this, safe and smooth driving can be achieved.

Moreover, for example, headlamp 1 further includes: heat dissipating element 40 on which low beam light source module 10 is disposed; and high beam light source module 20 that is disposed on heat dissipating element 40 and emits light toward first lens body 31. First lens body 31 transmits and projects, to fourth region 150 farther from headlamp 1 than first region A1, light from high beam light source module 20.

In this way, low beam light source module 10 and high beam light source module 20 are fixed to a single heat dissipating element 40. In other words, headlamp 1 is compact and can emit both high and low beams as a single unit. Thus, the space in the front portion of vehicle body 110 can be effectively used.

Moreover, for example, automobile 100 includes headlamp 1; vehicle body 100 including headlamp 1 installed in a front portion of vehicle body 110; and engine control unit 130 connected to headlamp 1. High beam light source module 20 is configured to selectively illuminate subregions 151 through 154 of fourth region 150. Engine control unit 130 determines a subregion to be illuminated among subregions 151 through 154.

With this, for example, when oncoming vehicle 160 is present, it is possible to not project light to a subregion corresponding to the location of oncoming vehicle 160 and project light to the other subregions. Thus, it is possible to reduce glare for oncoming traffic while inhibiting a decrease in visibility for the driver of automobile 100. With this, safe and smooth driving can be achieved.

Variation 1

Next, Variation 1 of headlamp 1 according to the above embodiment will be described with reference to the drawings.

Figure 11:
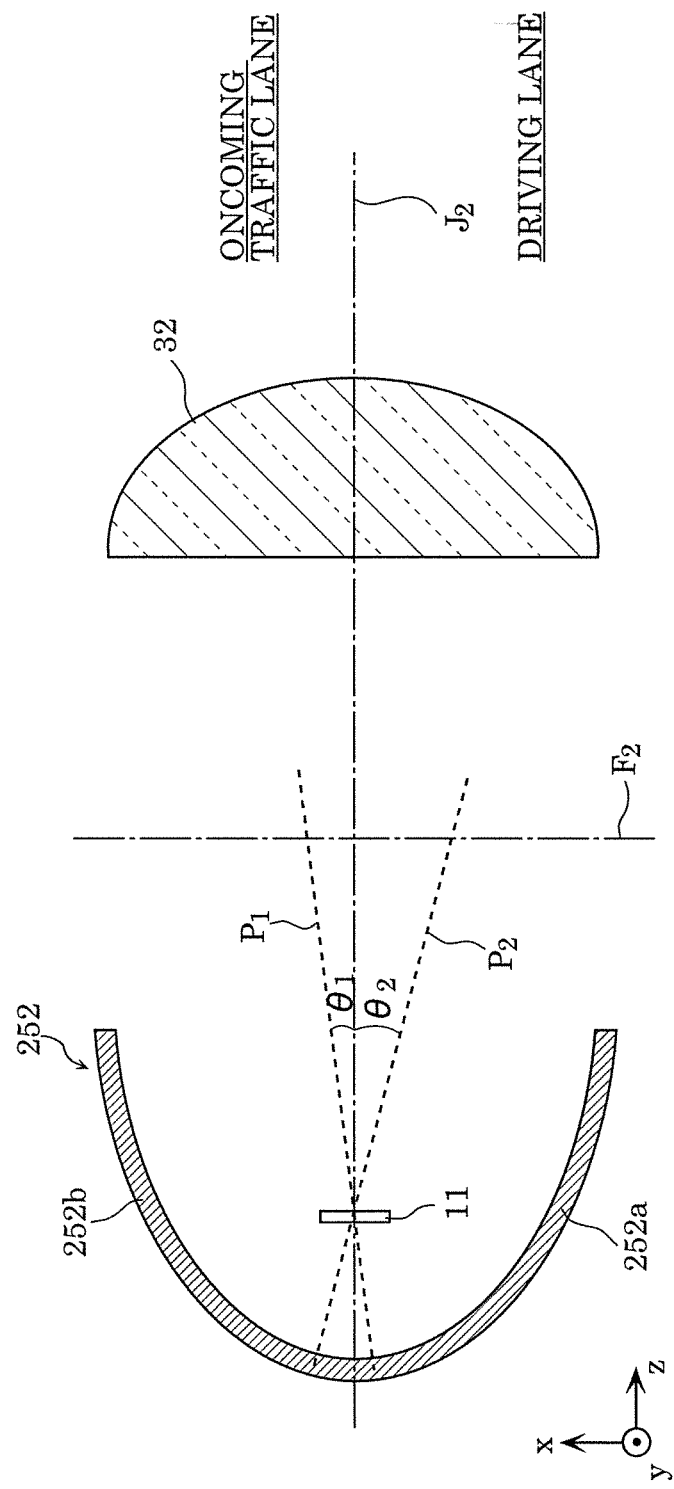
FIG. 11 schematically illustrates horizontal characteristics of a reflector according to variation 1 of the embodiment.

FIG. 11 schematically illustrates horizontal characteristics of a reflector according to this variation. More specifically, FIG. 11 illustrates a cross section (XZ cross section) taken perpendicular to the optical axis of low beam light emitting device 11 and passing through second reflector section 252 of the reflector and second lens body 32.

Second reflector section 252 of the reflector according to this variation differs from second reflector section 52 according to the above embodiment in regard to its shape in the XZ cross section. More specifically, second reflector section 252 has, in the XZ cross section, a shape defined by two parabolas having mutually different axes of symmetry.

As illustrated in FIG. 11, second reflector section 252 includes first parabola section 252a and second parabola section 252b. First parabola section 252a has axis of symmetry $P_1$ and corresponds to the portion of second lens body 32 corresponding to the negative side of the X axis relative to central axis $J_2$. Second parabola section 252b has axis of symmetry $P_2$ and corresponds to the portion of second lens body 32 corresponding to the positive side of the X axis relative to central axis $J_2$.

In this embodiment, axes of symmetry $P_1$ and $P_2$ intersect one another. More specifically, when viewed in the positive direction of the Y axis, axes of symmetry $P_1$ and $P_2$ intersect one another in a position that overlaps with low beam light emitting device 11 (low beam light source module 10). Axes of symmetry $P_1$ and $P_2$ incline at predetermined angles relative to central axis $J_2$. Accordingly, second reflector section 252 can spread light from low beam light source module 10 horizontally (along the X axis).

In the example illustrated in FIG. 11, axes of symmetry $P_1$ and $P_2$ are inclined at different angles relative to central axis $J_2$. More specifically, axis of symmetry $P_1$ inclines at angle $\theta_1$ relative to central axis $J_2$. Axis of symmetry $P_2$ inclines at angle $\theta_2$ relative to central axis $J_2$. Here, angle $\theta_1$ is smaller than angle $\theta_2$. In other words, axis of symmetry $P_2$ of second parabola section 252b has a greater incline than axis of symmetry P₁ of first parabola section 252a.

Light reflected by second parabola section 252b passes through second lens body 32 and is projected toward the oncoming traffic lane side. Light reflected by first parabola section 252a passes through second lens body 32 and is projected toward the driving lane side. Designing the reflector such that axis of symmetry P₂ has a greater incline than axis of symmetry P₁ makes t possible to horizontally spread light emitted to the oncoming traffic lane side, more so than the amount that the light emitted to the driving lane side is spread.

As described above, with the headlamp according to this variation, for example, second reflector section 252 has, in a cross section taken perpendicular to the optical axis of low beam light source module 10, a shape defined by two parabolas whose axes of symmetry intersect one another.

In this way, since the axes of symmetry of the parabolas defining a shape of second reflector section 252 intersect one another, light L2 can be spread horizontally. With this, since light L2 that illuminates second region A2 can be spread horizontally, a wider region can be made to be brighter.

Moreover, for example, the axes of symmetry of the two parabolas intersect one another at a position overlapping low beam light source module 10 when viewed along the optical axis of low beam light source module 10.

This makes it easier to control the direction in which light from low beam light source module 10 is reflected and thus makes it easier to form a desired illumination region.

Moreover, for example, the axes of symmetry of the two parabolas form different angles relative to central axis J₂ of second lens body 32 when viewed along the optical axis of low beam light source module 10.

With this, the amount of light spread right and left in the horizontal direction of second region A2 can be made to be different from each other. For example, since the illumination region on the oncoming traffic lane side can be widened toward the shoulder of the road (to the left (American standard), the shoulder of the road can be brightened over a wider region. With this, safe and smooth driving can be achieved.

Note that in this variation, the parabolic shape of second reflector section 52 is described, but first reflector section 51 or third reflector section 53 may have the same shape. With this, first region A1 or third region A3 can be widened horizontally.

Variation 2

Next, Variation 2 of headlamp 1 according to the above embodiment will be described with reference to the drawings.

With headlamp 1 according to the above embodiment, the surfaces of incidence of lens 30—that is to say, surface of incidence 31a of first lens body 31 and surface of incidence 32a of second lens body 32—are exemplified as, but not limited to, being flush with one another.

Figure 12A:
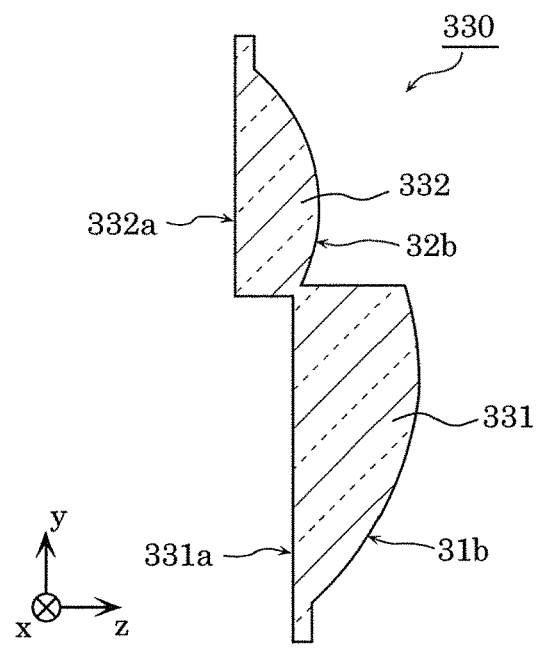
FIG. 12A is a cross sectional view of one example of a lens body according to variation 2 of the embodiment.
Figure 12B:
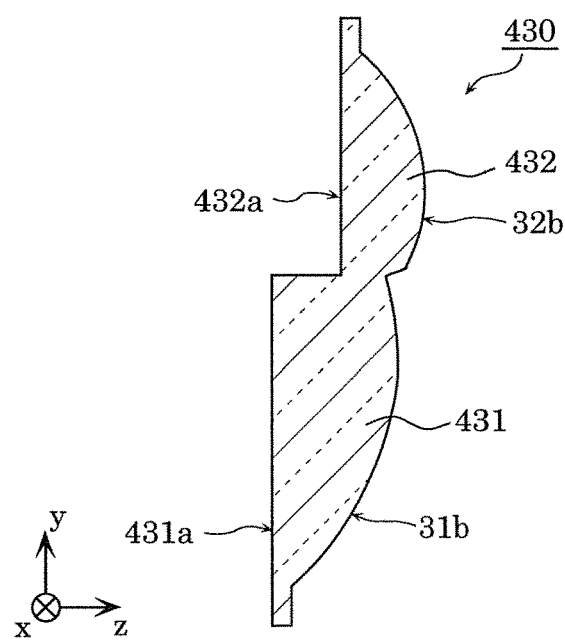
FIG. 12B is a cross sectional view of another example of a lens body according to variation 2 of the embodiment.

FIG. 12A and FIG. 12B are cross sectional views of lenses 330 and 430 according to the present variation.

As illustrated in FIG. 12A, lens 330 includes first lens body 331 and second lens body 332. Surface of incidence 331a of first lens body 331 and surface of incidence 332a of second lens body 332 are not flush with one another, but are rather staggered in the front-and-back directions (i.e., along the X axis). More specifically, surface of incidence 331a is positioned farther forward than surface of incidence 332a.

Note that first lens body 331 has the same shape as first lens body 31 described in the above embodiment, and second lens body 332 has the same shape as second lens body 32 described in the above embodiment. In other words, the focal distance of first lens body 331 is longer than the focal distance of second lens body 332.

Moreover, as illustrated in FIG. 12B, lens 430 includes first lens body 431 and second lens body 432. Surface of incidence 431a of first lens body 431 and surface of incidence 432a of second lens body 432 are not flush with one another, but are rather staggered in the front-and-back directions (i.e., along the X axis). More specifically, surface of incidence 431a is positioned further rearward than surface of incidence 432a.

Note that first lens body 431 has the same shape as first lens body 31 described in the above embodiment, and second lens body 432 has the same shape as second lens body 32 described in the above embodiment. In other words, the focal distance of first lens body 431 is longer than the focal distance of second lens body 432.

As described above, light distribution can be changed as the projection magnification varies according to the focal length of the lens body. As such, the location of the surface of incidence is not particularly limited.

(Other Variations)

Although the headlamp and mobile object according to the present disclosure have been described based on the above embodiment and variations thereof, the present disclosure is not limited thereto.

For example, focal length $f_1$ of first lens body 31 and focal length $f_2$ of second lens body 32 may be the same length. For example, broadly distributed light and narrowly distributed light may be achieved using, for example, a shielding member not illustrated in the drawings.

Moreover, for example, in the exemplary embodiment, automobile 100 includes two headlamps 1, but automobile 100 is not limited to this example. For example, automobile 100 may include two headlamps 1 on each of the right and left sides of vehicle body 110. In other words, automobile 100 may include three or more headlamps 1 and, alternatively, may include only one headlamp 1.

For example, in the above embodiment, headlamp 1 is exemplified as a headlamp that emits a low and high beams primarily for nighttime driving, but headlamp 1 may be for use in foggy conditions (otherwise referred to as a fog lamp) or as a day time running light (DRL).

Moreover, for example, in the above embodiment, LEDs are given as an example of the light emitting devices, but laser devices such as semiconductor lasers, or light emitting devices such as organic electro-luminescent (EL) devices and non-organic EL devices may be used.

Moreover, for example, in the above embodiment, automobile 100 is given as one example of the mobile object, but the mobile object is not limited to this example. The mobile object may be, for example, a two-wheeled automobile (e.g., scooter or motorcycle).

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A headlamp that projects light forward, the headlamp comprising:
   a light source;

a reflector disposed in a path of light from the light source; and a first lens body and a second lens body that are disposed farther forward than the light source and the reflector, wherein the reflector reflects first light toward the first lens body and reflects second light toward the second lens body, the first light being a first portion of the light from the light source and the second light being a second portion of the light from the light source, the first lens body transmits and projects, to a first region, the first light reflected by the reflector, the second lens body transmits and projects, to a second region, the second light reflected by the reflector, the second region being larger than the first region and including a region closer to the headlamp than the first region, and the first light is higher in luminous intensity than the second light, and wherein
the reflector includes:
a first reflector section that reflects the first light toward the first lens body; and
a second reflector section that reflects the second light toward the second lens body,
the first reflector section and the second reflector section each have, in a cross section taken along an optical axis of the light source, a shape of an elliptical arc, and
an interfocal distance of the elliptical arc of the first reflector section is shorter than an interfocal distance of the elliptical arc of the second reflector section.

2. The headlamp according to claim 1, wherein a focal length of the first lens body is longer than a focal length of the second lens body.

3. The headlamp according to claim 1, wherein the second reflector section has, in a cross section taken perpendicular to the optical axis of the light source, a shape defined by two parabolas whose axes of symmetry intersect one another.

4. The headlamp according to claim 3, wherein the axes of symmetry of the two parabolas intersect one another at a position overlapping the light source when viewed along the optical axis of the light source.

5. The headlamp according to claim 3, wherein the axes of symmetry of the two parabolas form different angles relative to a central axis of the second lens body when viewed along the optical axis of the light source.

6. The headlamp according to claim 1, wherein
the light source is a low beam light source,
the headlamp further comprises:
a heat dissipating element on which the light source is disposed; and
a high beam light source that is disposed on the heat dissipating element and emits light toward the first lens body, and
the first lens body transmits and projects, to a fourth region farther from the headlamp than the first region, light from the high beam light source.

7. A headlamp that projects light forward, the headlamp comprising:
a light source;
a reflector disposed in a path of light from the light source; and
a first lens body and a second lens body that are disposed farther forward than the light source and the reflector,
wherein the reflector reflects first light toward the first lens body and reflects second light toward the second lens body, the first light being a first portion of the light from the light source and the second light being a second portion of the light from the light source, the first lens body transmits and projects, to a first region, the first light reflected by the reflector, the second lens body transmits and projects, to a second region, the second light reflected by the reflector, the second region being larger than the first region and including a region closer to the headlamp than the first region, and the first light is higher in luminous intensity than the second light, and further comprising a shield disposed between the second lens body and the light source, wherein the reflector further reflects third light, which is a third portion of the light from the light source, toward the shield, the shield reflects, toward the second lens body, the third light reflected by the reflector, and the second lens body transmits and projects, to a third region above the second region, the third light reflected by the shield.

8. The headlamp according to claim 7, wherein the shield forms a cutoff line defining an edge of the second region by blocking a portion of the second light reflected by the reflector.

9. The headlamp according to claim 7, wherein
the shield includes a shielding section that blocks a portion of the first light reflected by the reflector, and
in a front view, the shielding section is disposed below a central axis of first lens body and to one of a left side and right side of the central axis.

10. A mobile object, comprising:
a vehicle body; and
a headlamp installed in a front portion of the vehicle body in order to project light forward, the headlamp comprising:
a light source;
a reflector disposed in a path of light from the light source; and
a first lens body and a second lens body that are disposed farther forward than the light source and the reflector,
wherein the reflector reflects first light toward the first lens body and reflects second light toward the second lens body, the first light being a first portion of the light from the light source and the second light being a second portion of the light from the light source,
the first lens body transmits and projects, to a first region in front of the vehicle body, the first light reflected by the reflector,
the second lens body transmits and projects, to a second region in front of the vehicle body, the second light reflected by the reflector, the second region being larger than the first region and including a region closer to the headlamp than the first region, and
the first light is higher in luminous intensity than the second light, and
wherein
the reflector includes:
a first reflector section that reflects the first light toward the first lens body; and
a second reflector section that reflects the second light toward the second lens body,
the first reflector section and the second reflector section each have, in a cross section taken along an optical axis of the light source, a shape of an elliptical arc, and an interfocal distance of the elliptical arc of the first reflector section is shorter than an interfocal distance of the elliptical arc of the second reflector section.

11. The mobile object according to claim 10, wherein a focal length of the first lens body is longer than a focal length of the second lens body.

12. The mobile object according to claim 10, wherein the headlamp is a headlamp for one or more of nighttime driving, driving in fog and driving in daytime.

13. The mobile object according to claim 10, wherein the light source is a low beam light source,
the headlamp further comprises:
a heat dissipating element on which the light source is disposed; and
a high beam light source that is disposed on the heat dissipating element and emits light toward the first lens body, and
the first lens body transmits and projects, to a fourth region farther from the headlamp than the first region, light from the high beam light source.

14. The mobile object according to claim 13, further comprising:
an engine control unit connected to the headlamp,
wherein the high beam light source is configured to selectively illuminate subregions of the fourth region, and
the engine control unit determines a subregion or subregions to be illuminated among the subregions.

15. The mobile object according to claim 14, further comprising:
a camera mounted to the vehicle body which images an area in front of the vehicle body, and
wherein the engine control unit recognizes from an image captured by the camera a position of an object in front of the vehicle body that should not be illuminated with light and determines the subregion or subregions to be illuminated based thereon.

16. A mobile object, comprising:
a vehicle body; and
a headlamp installed in a front portion of the vehicle body in order to project light forward, the headlamp comprising:
a light source;
a reflector disposed in a path of light from the light source; and
a first lens body and a second lens body that are disposed farther forward than the light source and the reflector,
wherein the reflector reflects first light toward the first lens body and reflects second light toward the second lens body, the first light being a first portion of the light from the light source and the second light being a second portion of the light from the light source,
the first lens body transmits and projects, to a first region in front of the vehicle body, the first light reflected by the reflector,
the second lens body transmits and projects, to a second region in front of the vehicle body, the second light reflected by the reflector, the second region being larger than the first region and including a region closer to the headlamp than the first region, and
the first light is higher in luminous intensity than the second light, and
further comprising a shield disposed between the second lens body and the light source,
wherein the reflector further reflects third light, which is a third portion of the light from the light source, toward the shield,
the shield reflects, toward the second lens body, the third light reflected by the reflector, and
the second lens body transmits and projects, to a third region above the second region, the third light reflected by the shield.

17. The mobile object according to claim 16, wherein the shield forms a cutoff line defining an edge of the second region by blocking a portion of the second light reflected by the reflector.

18. The mobile object according to claim 16, wherein
the shield includes a shielding section that blocks a portion of the first light reflected by the reflector, and
in a front view, the shielding section is disposed below a central axis of first lens body and to one of a left side and right side of the central axis.

* * * * *